(12) United States Patent
Twitchell, Jr.

(10) Patent No.: US 7,200,132 B2
(45) Date of Patent: *Apr. 3, 2007

(54) **FORMING *AD HOC* RSI NETWORKS AMONG TRANSCEIVERS SHARING COMMON DESIGNATION**

(75) Inventor: Robert W. Twitchell, Jr., Suwanee, GA (US)

(73) Assignee: Terahop Networks, Inc., Alpharetta, GA (US)

( * ) Notice: Subject to any disclaimer, the term of this patent is extended or adjusted under 35 U.S.C. 154(b) by 123 days.

This patent is subject to a terminal disclaimer.

(21) Appl. No.: 11/161,540

(22) Filed: Aug. 8, 2005

(65) Prior Publication Data

US 2007/0004431 A1  Jan. 4, 2007

Related U.S. Application Data

(63) Continuation-in-part of application No. 10/604,032, filed on Jun. 23, 2003, now Pat. No. 6,934,540, which is a continuation-in-part of application No. 09/681,282, filed on Mar. 13, 2001, now Pat. No. 6,745,027, and a continuation-in-part of application No. PCT/US01/49513, filed on Dec. 26, 2001, application No. 11/161,540, which is a continuation-in-part of application No. 10/514,336, filed as application No. PCT/US03/14987 on May 14, 2003, application No. 11/161,540, which is a continuation-in-part of application No. 10/987,884, filed on Nov. 12, 2004, now Pat. No. 7,133,704, and a continuation-in-part of application No. 10/987,964, filed on Nov. 12, 2004, now Pat. No. 7,155,264.

(60) Provisional application No. 60/696,159, filed on Jul. 1, 2005, provisional application No. 60/691,884, filed on Jun. 17, 2005, provisional application No. 60/691,718, filed on Jun. 17, 2005, provisional application No. 60/691,574, filed on Jun. 17, 2005, provisional application No. 60/595,233, filed on Jun. 16, 2005, provisional application No. 60/688,737, filed on Jun. 8, 2005, provisional application No. 60/687,415, filed on Jun. 3, 2005, provisional application No. 60/687,073, filed on Jun. 3, 2005, provisional application No. 60/642,632, filed on Jan. 10, 2005, provisional application No. 60/380,670, filed on May 16, 2002, provisional application No. 60/380,195, filed on May 14, 2002, provisional application No. 60/257,637, filed on Dec. 22, 2000, provisional application No. 60/257,398, filed on Dec. 22, 2000.

(51) Int. Cl.
*H04Q 7/24* (2006.01)

(52) U.S. Cl. ............... 370/338; 370/328; 370/254; 370/401; 455/41.2

(58) Field of Classification Search ............ 370/328, 370/338, 254, 401, 402, 405; 455/41.2
See application file for complete search history.

(56) References Cited

U.S. PATENT DOCUMENTS

| | | |
|---|---|---|
| 4,613,990 A | 9/1986 | Halpern |
| 4,680,583 A | 7/1987 | Grover |
| 5,040,238 A | 8/1991 | Comroe |
| 5,117,501 A | 5/1992 | Childress |
| 5,129,096 A | 7/1992 | Burns |
| 5,295,154 A | 3/1994 | Meier |
| 5,331,637 A | 7/1994 | Francis |
| 5,369,784 A | 11/1994 | Nelson |
| 5,425,051 A | 6/1995 | Mahany |
| 5,442,758 A | 8/1995 | Slingwine |
| 5,511,232 A | 4/1996 | O'Dea |
| 5,579,306 A | 11/1996 | Dent |
| 5,590,409 A | 12/1996 | Sawahashi |
| 5,604,892 A | 2/1997 | Nuttall |
| 5,652,751 A | 7/1997 | Sharony |
| 5,682,379 A | 10/1997 | Mahany |
| 5,732,077 A | 3/1998 | Whitehead |
| 5,761,195 A | 6/1998 | Lu |
| 5,790,946 A | 8/1998 | Rotzoll |
| 5,833,910 A | 11/1998 | Texido |
| 5,890,054 A | 3/1999 | Logsdon |
| 5,907,491 A | 5/1999 | Canada |

| | | | |
|---|---|---|---|
| 5,917,423 A | 6/1999 | Duvall | |
| 5,939,982 A | 8/1999 | Gagnon | |
| 5,943,610 A | 8/1999 | Endo | |
| 5,950,124 A | 9/1999 | Trompower | |
| 5,974,236 A | 10/1999 | Sherman | |
| 5,977,913 A | 11/1999 | Christ | |
| 6,005,884 A | 12/1999 | Cook | |
| 6,006,100 A | 12/1999 | Koenck | |
| 6,072,784 A | 6/2000 | Agrawal | |
| 6,078,789 A | 6/2000 | Bodenmann | |
| 6,091,724 A | 7/2000 | Chandra | |
| 6,097,707 A | 8/2000 | Hodzic | |
| 6,104,512 A | 8/2000 | Batey | |
| 6,118,988 A | 9/2000 | Choi | |
| 6,125,306 A | 9/2000 | Shimada | |
| 6,127,976 A | 10/2000 | Boyd et al. | |
| 6,134,587 A | 10/2000 | Okanoue | |
| 6,192,400 B1 | 2/2001 | Hanson | |
| 6,198,913 B1 | 3/2001 | Sung et al. | |
| 6,201,974 B1 | 3/2001 | Lietsaimi | |
| 6,256,303 B1 | 7/2001 | Drakoulis | |
| 6,313,745 B1 | 11/2001 | Suzuki | |
| 6,354,493 B1 * | 3/2002 | Mon | 235/380 |
| 6,381,467 B1 * | 4/2002 | Hill et al. | 455/519 |
| 6,405,102 B1 | 6/2002 | Swartz | |
| 6,409,082 B1 * | 6/2002 | Davis et al. | 235/385 |
| 6,418,299 B1 | 7/2002 | Ramanathan | |
| 6,424,260 B2 | 7/2002 | Maloney | |
| 6,424,264 B1 | 7/2002 | Giraldin | |
| 6,427,913 B1 | 8/2002 | Maloney | |
| 6,512,478 B1 | 1/2003 | Chien | |
| 6,529,142 B2 | 3/2003 | Yeh | |
| 6,547,137 B1 | 4/2003 | Begelfer | |
| 6,559,270 B1 | 5/2003 | Zhou | |
| 6,600,418 B2 | 7/2003 | Francis | |
| 6,611,556 B1 | 8/2003 | Koener | |
| 6,614,349 B1 * | 9/2003 | Proctor et al. | 340/572.1 |
| 6,665,585 B2 | 12/2003 | Kawase | |
| 6,737,974 B2 | 5/2004 | Dickinson | |
| 6,745,027 B2 | 6/2004 | Twitchell, Jr. | |
| 6,753,775 B2 | 6/2004 | Auerbach | |
| 6,757,262 B1 | 6/2004 | Giraldin | |
| 6,760,578 B2 | 7/2004 | Rotzoll | |
| 6,816,063 B2 | 11/2004 | Kubler et al. | |
| 6,847,892 B2 | 1/2005 | Zhou | |
| 6,934,540 B2 | 8/2005 | Twitchell, Jr. | |
| 6,975,614 B2 | 12/2005 | Kennedy | |
| 7,027,773 B1 | 4/2006 | McMillin | |
| 7,098,784 B2 | 8/2006 | Easley et al. | |
| 7,126,470 B2 | 10/2006 | Clift et al. | |
| 7,133,704 B2 | 11/2006 | Twitchell, Jr. | |
| 2001/0000019 A1 | 3/2001 | Bowers et al. | |
| 2002/0039896 A1 | 4/2002 | Brown | |
| 2002/0098861 A1 | 7/2002 | Doney | |
| 2002/0119770 A1 | 8/2002 | Twitchell, Jr. | |
| 2002/0146985 A1 | 10/2002 | Naden | |
| 2003/0141973 A1 | 7/2003 | Yeh | |
| 2003/0179073 A1 | 9/2003 | Ghazarian | |
| 2003/0209601 A1 | 11/2003 | Chung | |
| 2004/0021572 A1 | 2/2004 | Schoen | |
| 2004/0041731 A1 | 3/2004 | Hisano | |
| 2004/0082296 A1 | 4/2004 | Twitchell, Jr. | |
| 2004/0100415 A1 | 5/2004 | Veitch | |
| 2004/0135691 A1 | 7/2004 | Duron | |
| 2004/0183673 A1 | 9/2004 | Nageli | |
| 2005/0093702 A1 | 5/2005 | Twitchell, Jr. | |
| 2005/0093703 A1 | 5/2005 | Twitchell, Jr. | |
| 2005/0215280 A1 | 9/2005 | Twitchell, Jr. | |
| 2005/0226201 A1 | 10/2005 | McMillin | |

FOREIGN PATENT DOCUMENTS

| | | | |
|---|---|---|---|
| EP | 0748083 A1 | 12/1996 | |
| EP | 0748085 A1 | 12/1996 | |
| EP | 0829995 A2 | 3/1998 | |
| WO | WO-00/68907 | 11/2000 | |
| WO | WO 00/69186 | 11/2000 | |

OTHER PUBLICATIONS

U.S. Appl. No. 60/499,338, of Easley et al., filed Sep. 3, 2003.
Keshavarzian et al., Energy-Efficient Link Assessment in Wireless Sensor Networks, INFOCOM 2004. 23rd Annual Joint Conference of the IEEE Computer and Communications Societies, vol. 3, 2004, pp. 1751-1761.
Stojmenovic et al., Design Giudelines for Routing Protocols in Ad Hoc and Sensor Networks with a Realistic Physical Layer, Communications Magazine, IEEE, vol. 43, Issue 3, Mar. 2005, pp. 101-106.
Melodia et al., On the Interdependence of Distributed Topology Control and Geographical Routing in Ad Hoc and Sensor Networks, Selected Areas in Communications, IEEE Journal, vol. 23, Issue 3, Mar. 2005, pp. 520-532.
Gary Morgan, Miniature Tags Provide Visibility and Cohesion for an LTA Batallion Level 'Proof of Principle', Pacific NW National Laboratory, Apr. 2001, Gary.morgan@pnl.go.
Kevin Sharp, Physical Reality: A Second Look, Supply Chain Systems, http://www.idsystems.com/reader/1999_03/phys0399_pt2/index.htm, Mar. 1999, Helmers Publishing, Inc.
U.S. Appl. No. 60/444,029, of Nageli, filed Jan. 31, 2003.
Ram Ramanathan et al., Hierarchically-Organized, Multihop Mobile Wireless Networks for Quality-of-Service Support, pp. 1-35, 1998.
Guangyu Pei et al., Mobility Management in Hierarchical Multi-hop Mobile Wireless Networks, 6 pages, 1999.
http://www/iprg.nokia.com/~charliep/txt/manet/term.txt, Mobile Ad Hoc Networking Terminology, C. Perkins, Nov. 17, 1998, visited Nov. 13, 2000.
Daniel Lihui Gu et al., C-ICAMA, A Centralized Intelligent Channel Assigned Multiple Access for Multi-Layer Ad-Hoc Wireless Networks with UAVs, 6 pages, 2000.
Atushi Iwata, et al., Scalable Routing Strategies for Ad Hoc Wireless Networks, 1999, pp. 1-26.
http://www.cs.ucla.edu/NRL/wireless/PAPER/draft-ietf-manet-admrp-02.txt, On-Demand Multicast Routing Protocol (ODMRP) for Ad Hoc Networks, Jan. 2000, visited Nov. 13, 2000.
Guangyu Pei, et al., A Wireless Hierarchial Routing Protocol with Group Mobility, 1999, 5 pages.
http://sameh.html+22link+allocation%22+(network+or+networks)+)wireless+or+mobile)&hl, Self-Configuration of a Wireless ad-hoc Network, visited Nov. 13, 2000.
J.J. Garcia-Luna-Aceves et al., Source-Tree Routing in Wireless Networks, 1999, 10 pages.
Jean-Pierre Hubaux et al., Toward Self-Organized Mobile Ad Hoc Networks: The Terminodes Project, IEEE Communications Magazine, Jan. 2001.
Jaap Haartsen et al., Bluetooth: Vision, Goals, and Architecture, Mobile Computering & Communications Review, vol. 1, No. 2, 1998.
Jaap Haartsen, Bluetooth—The Universal Radio Interface for Ad Hoc, Wireless Connectivity, Ericsson Review, No. 3, pp. 110-117. 1998.
Daniel Lihui Gu et al., Hierarchical Routing for Multi-Layer Ad Hoc Wireless Networks with UAVs, 5 pages, 2000.
Charles E. Perkins, AD HOC Networks, Jan. 2001, table of contents, chapters 1,4, and 11.

* cited by examiner

*Primary Examiner*—Matthew Anderson
*Assistant Examiner*—Tuan Pham
(74) *Attorney, Agent, or Firm*—Tillman Wright, PLLC; Chad D. Tillman; James D. Wright

(57) ABSTRACT

A method of forming *ad hoc* RSI hierarchical communication networks among pluralities of wireless transceivers includes assigning to each of the transceivers one or more common designations. A network organization routine of the transceivers operates to establish hierarchical networks based on the transceivers' common designations, resulting in a logical network organization that provides efficiencies for acquiring information from particular transceivers that share a common designation. Each transceiver's common designation is used by a digital processor of the transceiver to selectively receive data packets that are intended for receipt by transceivers sharing the particular common designation. Such a "common designation" network reduces power consumption and signal interference thereby increasing battery life. Each transceiver may include a sensor interface a query handling routine in communication with a memory of the transceiver for serving as a dynamic distributed hierarchical database system of information such as, for example, sensor-derived information and time-sensitive information.

18 Claims, 15 Drawing Sheets

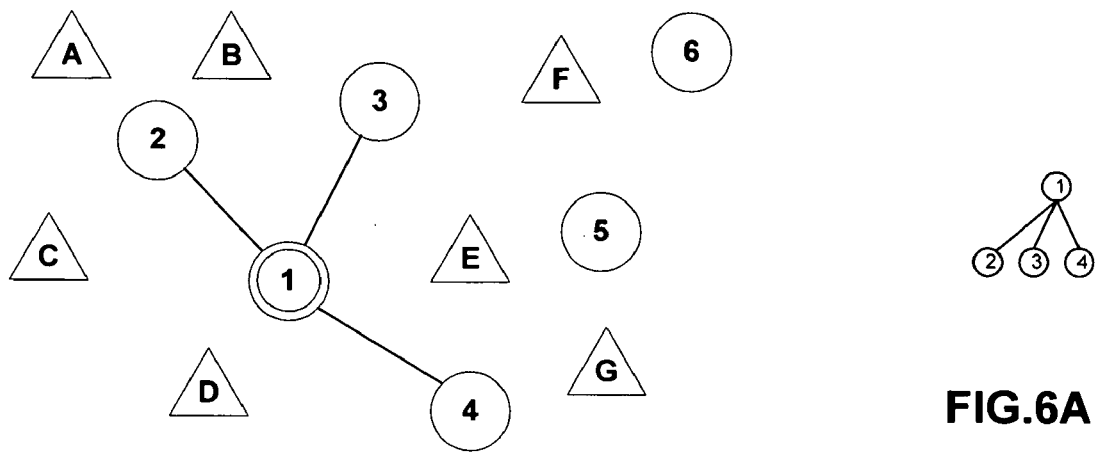
FIG. 6
FIG.6A
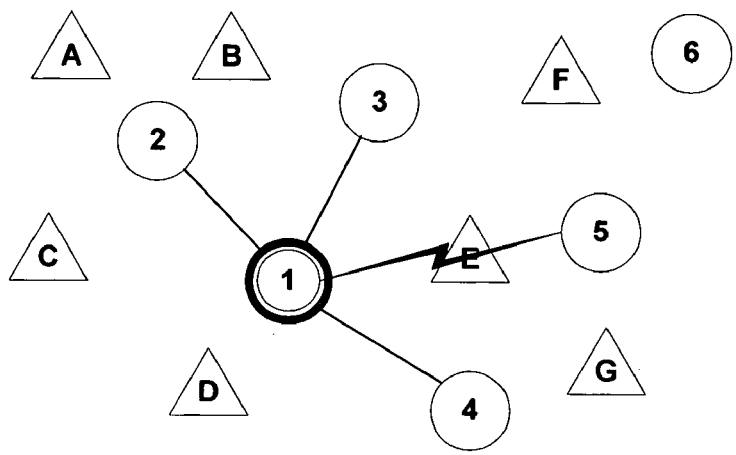
FIG. 7
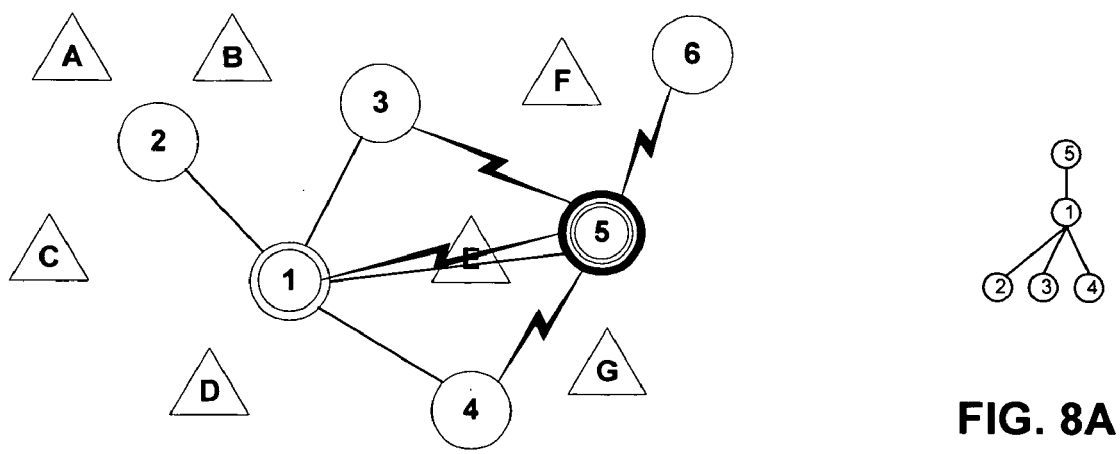
FIG. 8
FIG. 8A

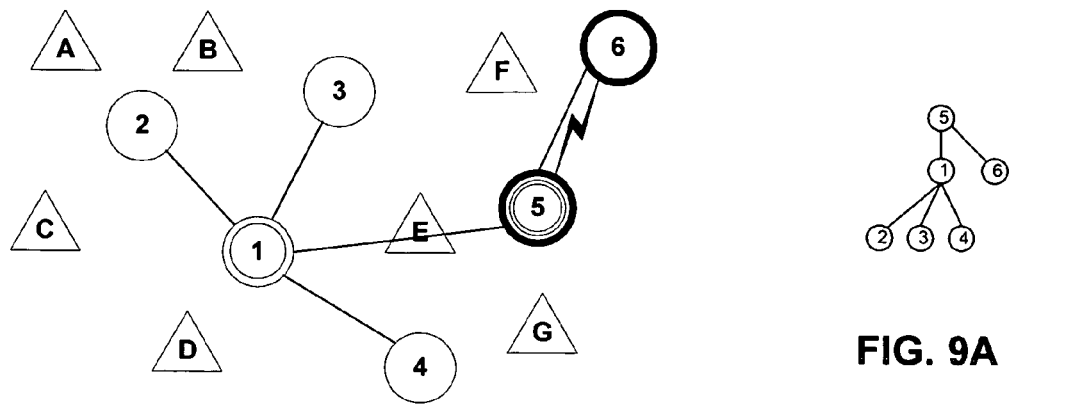
FIG. 9
FIG. 9A
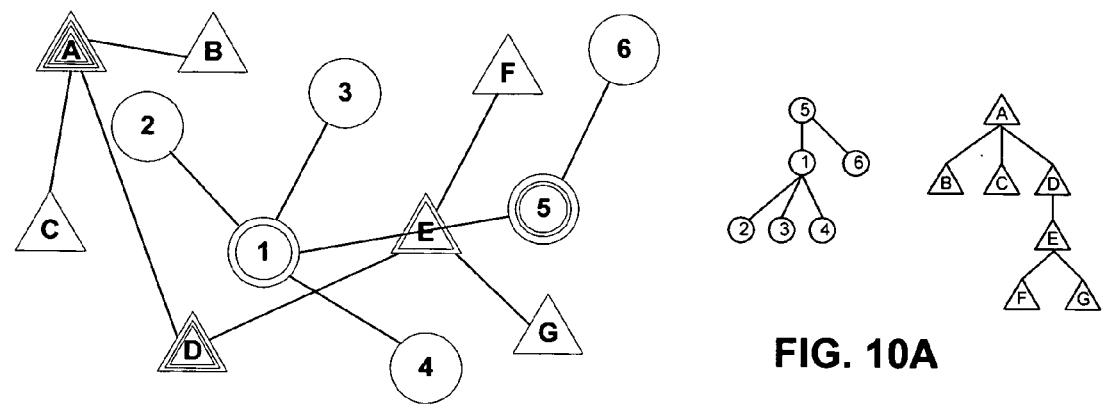
FIG. 10
FIG. 10A
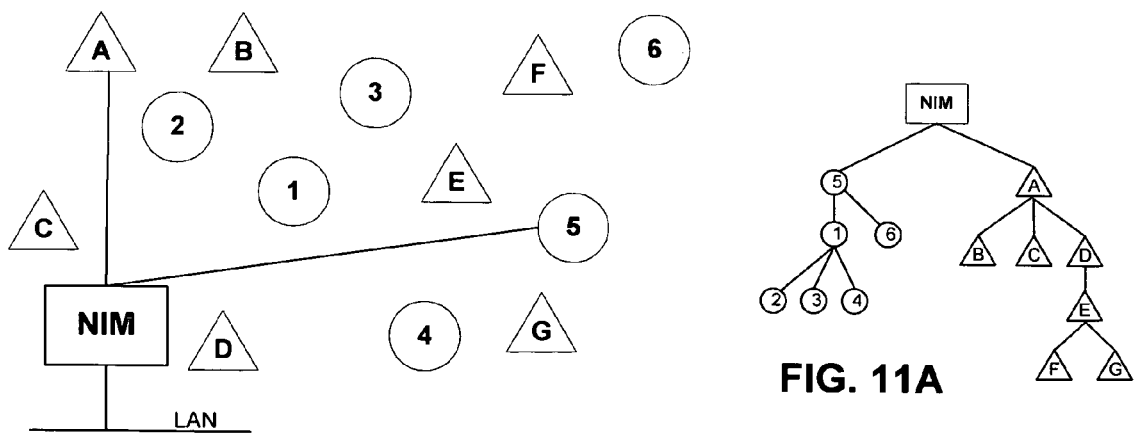
FIG. 11
FIG. 11A

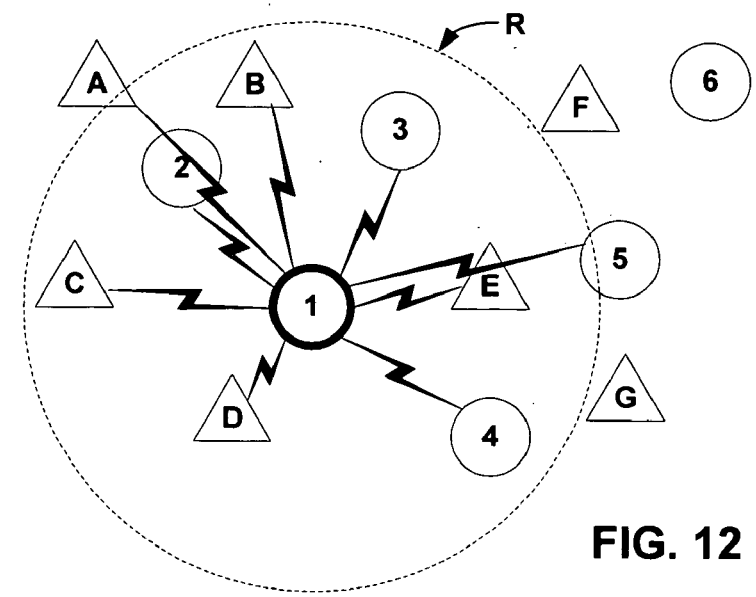
FIG. 12
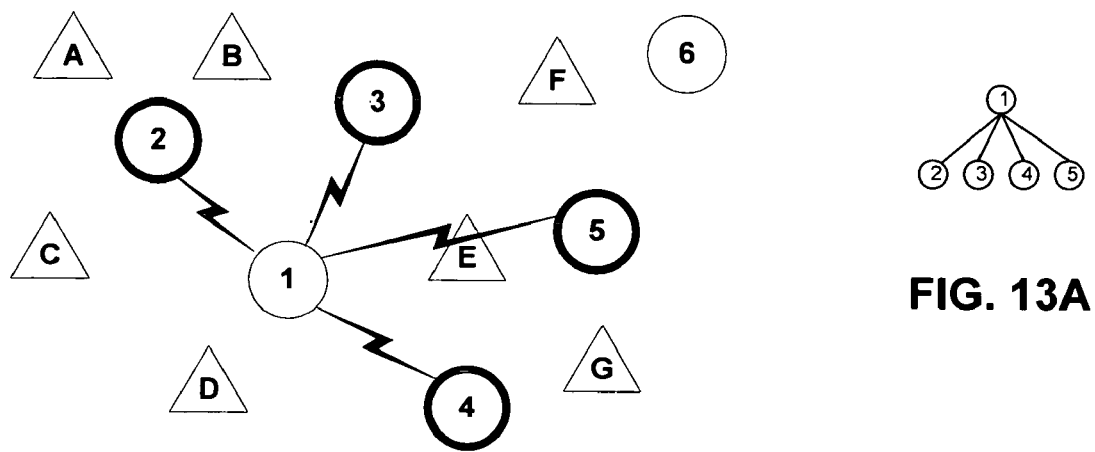
FIG. 13
FIG. 13A
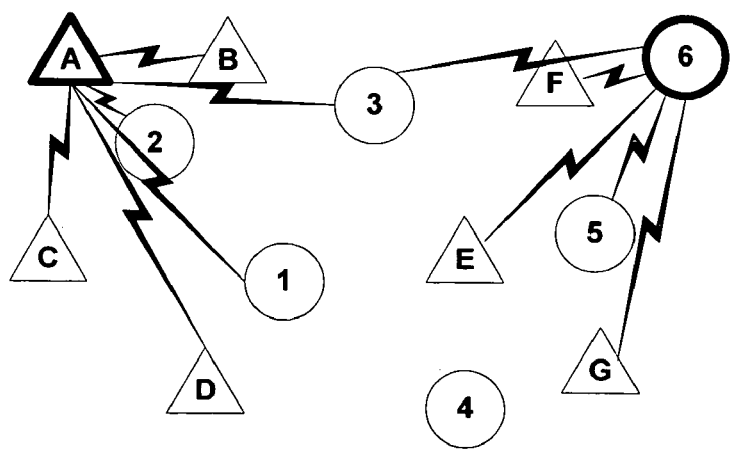
FIG. 14

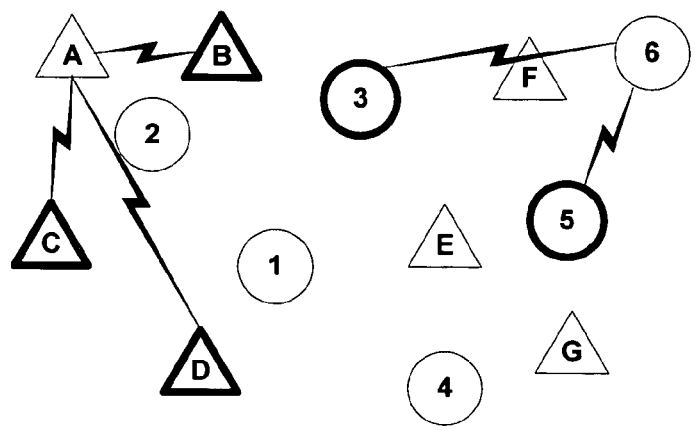
FIG. 15
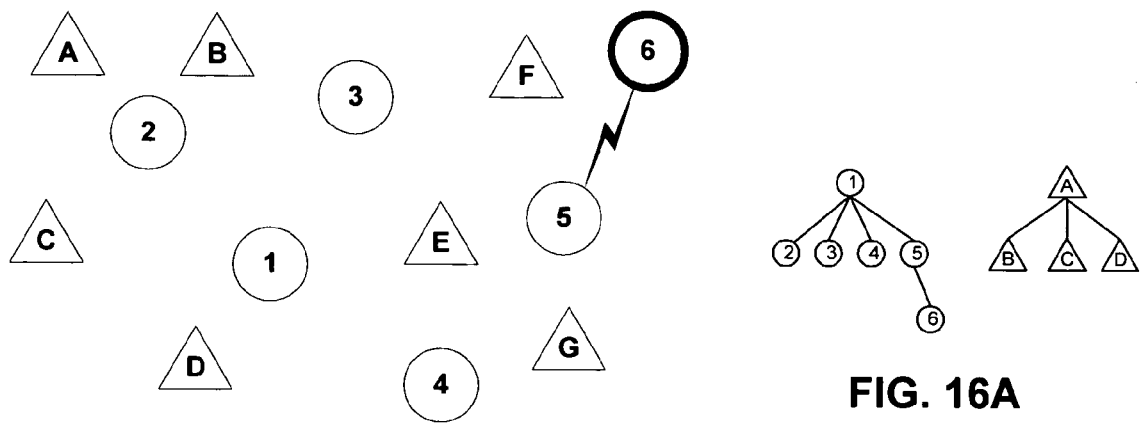
FIG. 16
FIG. 16A
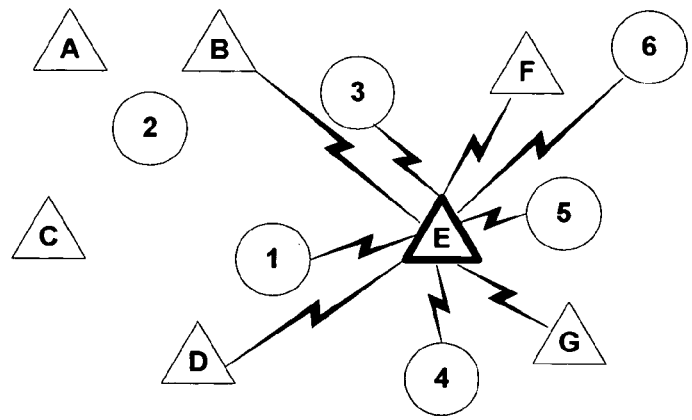
FIG. 17

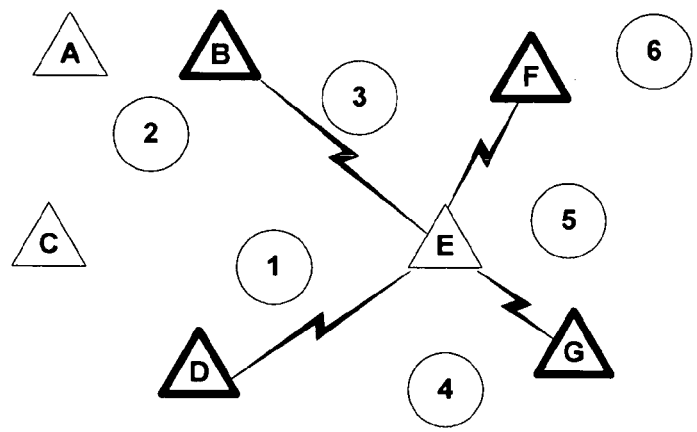
FIG. 18
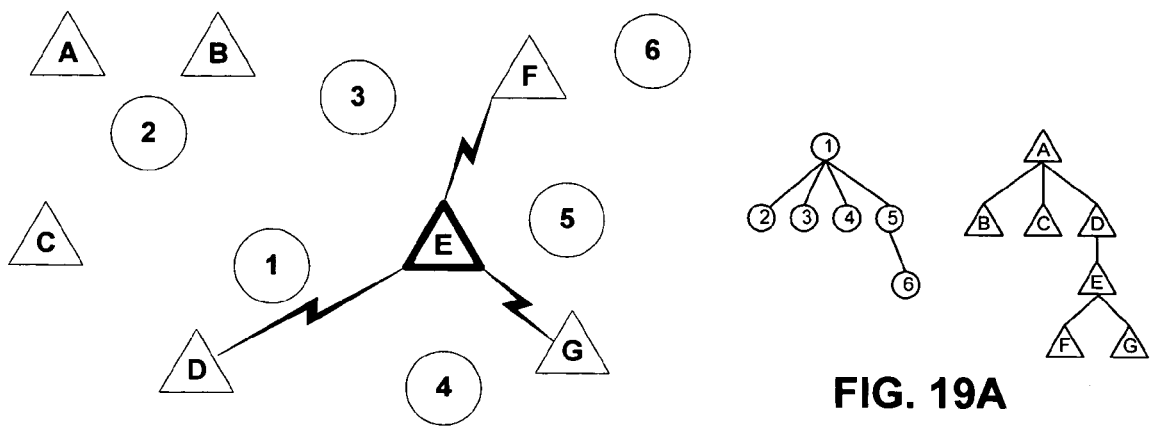
FIG. 19
FIG. 19A
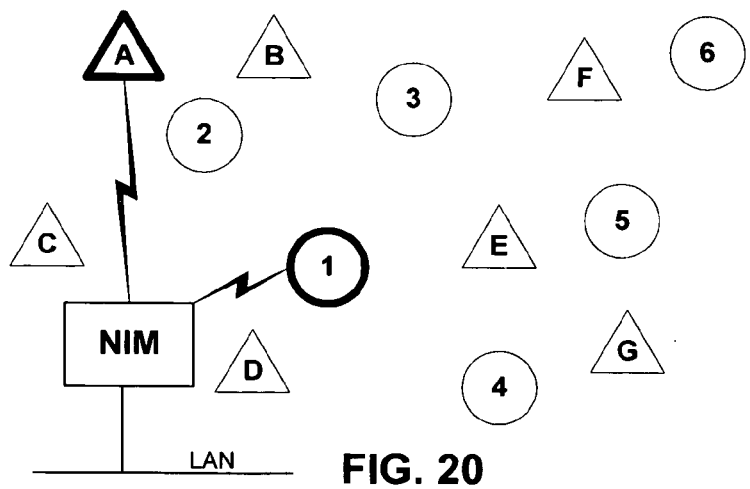
FIG. 20

TABLE 1

| Sending WRT No. | Preamble |
|---|---|
| 2 | : /circle/unit1 : /circle/unit2 : registration_request : /circle/unit1 |
| 3 | : /circle/unit1 : /circle/unit3 : registration_request : /circle/unit1 |
| 4 | : /circle/unit1 : /circle/unit4 : registration_request : /circle/unit1 |
| 5 | : /circle/unit1 : /circle/unit5 : registration_request : /circle/unit1 |
| 6 | : /circle/unit1 : /circle/unit6 : registration_request : /circle/unit1 |

FIG. 26

TABLE 2

| Target Wireless Reader Tag Unit No. | Preamble |
|---|---|
| 2 | : /circle/unit2 : /circle/unit1 : registration_ackn : /circle/unit1 |
| 3 | : /circle/unit3 : /circle/unit1 : registration_ackn : /circle/unit1 |
| 4 | : /circle/unit4 : /circle/unit1 : registration_ackn : /circle/unit1 |

FIG. 27

FORMING AD HOC RSI NETWORKS AMONG TRANSCEIVERS SHARING COMMON DESIGNATION

CROSS-REFERENCE TO RELATED APPLICATIONS

The present application claims the benefit under 35 U.S.C. § 119(e) and § 120 to and through each of, and is a continuation-in-part of: (1) application Ser. No. 10/604,032, Jun. 23, 2003 now U.S. Pat. No. 6,934,540, which published as no. US 2004/0082296 A1, incorporated herein by reference, and which is, (a) a continuation-in-part of application Ser. No. 09/681,282, Mar. 13, 2001 now U.S. Pat. No. 6,745,027 B2, incorporated herein by reference, which is a nonprovisional of application Ser. No. 60/257,637, Dec. 22, 2000 expired, incorporated herein by reference, and (b) a continuation-in-part of application no. PCT/US01/49513 filed Dec. 26, 2001, expired, designating the United States and published in English as WO 03/032501 A2, incorporated herein by reference, which is a, (i) continuation-in-part of application Ser. No. 09/681,282, Mar. 13, 2001 now U.S. Pat. No. 6,745,027 B2, which is a nonprovisional of application Ser. No. 60/257,637, Dec. 22, 2000 expired, and (ii) nonprovisional of, (A) application Ser. No. 60/257,637, Dec. 22, 2000 expired, and (B) application Ser. No. 60/257,398, Dec. 22, 2000 expired, incorporated herein by reference; (2) application Ser. No. 10/514,336, Nov. 12, 2004, which is a national stage of application no. PCT/US03/14987 filed May 14, 2003, expired, designating the United States and published in English as WO 03/098851, incorporated herein by reference, which is a, (a) continuation-in-part of application Ser. No. 09/681,282, Mar. 13, 2001 now U.S. Pat. No. 6,745,027 B2, which is a nonprovisional of application Ser. No. 60/257,637, Dec. 22, 2000 expired, (b) continuation-in-part of application no. PCT/US01/49513 filed Dec. 26, 2001, expired, which is a, (i) continuation-in-part of application Ser. No. 09/681,282, Mar. 13, 2001 now U.S. Pat. No. 6,745,027 B2, which is a nonprovisional of application Ser. No. 60/257,637, Dec. 22, 2000 expired, and (ii) a nonprovisional of (A) application Ser. No. 60/257,637, Dec. 22, 2000 expired, and (B) application Ser. No. 60/257,398, Dec. 22, 2000 expired, and (c) nonprovisional of, (i) application Ser. No. 60/380,195, May 14, 2002 expired, incorporated herein by reference, and (ii) application Ser. No. 60/380,670, May 16, 2002 expired, incorporated herein by reference; and (3) application Ser. No. 10/987,884 Nov. 12, 2004 now U.S. Pat. No. 7,133,704, which published as US 2005/0093702 A1, incorporated herein by reference, and which is a continuation of application no. PCT/US03/14987 filed May 14, 2003, expired, which is a, (a) continuation-in-part of application Ser. No. 09/681,282, Mar. 13, 2001 now U.S. Pat. No. 6,745,027 B2, which is a nonprovisional of application Ser. No. 60/257,637, Dec. 22, 2000 expired, (b) continuation-in-part of application No. PCT/US01/49513 filed Dec. 26, 2001, expired, which is a, (i) continuation-in-part of application Ser. No. 09/681,282, Mar. 13, 2001 now U.S. Pat. No. 6,745,027 B2, which is a nonprovisional of application Ser. No. 60/257,637, Dec. 22, 2000 expired, and (ii) nonprovisional of (A) application Ser. No. 60/257,637, Dec. 22, 2000 expired, and (B) application Ser. No. 60/257,398, Dec. 22, 2000 expired, and (c) nonprovisional of, (i) application Ser. No. 60/380,195, May 14, 2002 expired, and (ii) application Ser. No. 60/380,670, May 16, 2002 expired; and (4) application Ser. No. 10/987,964, Nov. 12, 2004, now U.S. Pat. No. 7,155,264 which published as US 2005/0093703, incorporated herein by reference, and which is a continuation of application no. PCT/US03/14987 filed May 14, 2003, expired, which is a, (a) continuation-in-part of application Ser. No. 09/681,282, Mar. 13, 2001 now U.S. Pat. No. 6,745,027 B2, which is a nonprovisional of application Ser. No. 60/257,637, May 16, 2002 expired, (b) continuation-in-part of application No. PCT/US01/49513 filed Dec. 26, 2001, expired, which is a, (i) continuation-in-part of application Ser. No. 09/681,282, Mar. 13, 2001 Mar. 13, 2001 now U.S. Pat. No. 6,745,027 B2, which is a nonprovisional of application Ser. No. 60/257,637, May 16, 2002 expired, and (ii) nonprovisional of (A) application Ser. No. 60/257,637, May 16, 2002 expired, and (B) application Ser. No. 60/257,398, Dec. 22, 2000 expired, and (c) nonprovisional of, (i) application Ser. No. 60/380,195, May 14, 2002 expired, and (ii) application Ser. No. 60/380,670, May 16, 2002 expired.

The present application further is a nonprovisional of, and claims the benefit under 35 U.S.C. § 119(e) to, each of: (1) application Ser. No. 60/595,233, Jun. 16, 2005, incorporated herein by reference, (2) application Ser. No. 60/642,632, Jan. 10, 2005, incorporated herein by reference, (3) application Ser. No. 60/687,073, Jun. 3, 2005, incorporated herein by reference, (4) application Ser. No. 60/687,415, Jun. 3, 2005, incorporated herein by reference, (5) application Ser. No. 60/688,737, Jun. 8, 2005 pending, incorporated herein by reference, (6) application Ser. No. 60/691,574, Jun. 17, 2005 pending, incorporated herein by reference, (7) application Ser. No. 60/691,718, Jun. 17, 2005 pending, incorporated herein by reference, (8) application Ser. No. 60/691,884, Jun. 17, 2005 pending, incorporated herein by reference, and (9) application Ser. No. 60/696,159, Jul. 1, 2005 pending, incorporated herein by reference.

FIELD OF THE PRESENT INVENTION

The present invention relates broadly to wireless transceivers, including the design of a wireless transceiver as well as to forming *ad hoc* networks with wireless transceivers and to communication protocols between wireless transceivers.

BACKGROUND OF THE PRESENT INVENTION

Wireless *ad hoc* networks allow node-to-node communication without central control or wired infrastructure. Such networks may have dynamic, randomly-changing, multihop topologies composed of wireless data communication links between the nodes. *Ad hoc* networks are advantageous because they are inexpensive, fault-tolerant, and flexible. Various known methods relate to data transmission within an *ad hoc* wireless data communication network. However, most known methods do not address self-configuration of wireless nodes for the formation and maintenance of efficient network topology.

Known *ad hoc* networking methods typically organize the network on the basis of geographic proximity of the nodes or the strength of signals received by the various nodes. Known methods of *ad hoc* network organization also require nodes to regularly transmit network information to all other nodes in the network, which results in increased radio traffic and interference. Increased radio interference inhibits the formation and maintenance of *ad hoc* networks having a large number of nodes and requires nodes to transmit at a greater power, which reduces their battery life.

Short range wireless technology utilizing standards based radio technology, such as the Bluetooth radio standard (hereinafter "Bluetooth"), promises to remove price barriers to mobile network use. By doing so, wireless devices are becoming available for applications where wired networks have been impracticable and in which prior wireless communication networks have been too expensive or inflexible. However, while Bluetooth radio technology is an *ad hoc* networking solution for personal data applications, it provides for only a limited number of communication channels, thereby restricting the number of Bluetooth devices that can communicate over an *ad hoc* network at any given time.

With regard to asset tracking, wireless data networks are known for use in warehouse management and other asset-tracking applications. However, existing wireless data network technologies are not well suited to asset tracking, which involves a large number of network nodes (e.g., hundreds or even thousands). Furthermore, existing wireless technologies are cost prohibitive, are prone to radio frequency (RF) interference, and consume a large amount of electrical power. Accordingly, wireless data networks are not commonly used in asset tracking.

Another obstacle to widespread implementation of the use of standards based radios, such as Bluetooth radios, especially in asset-tracking applications, is the limited life of the radio due to its power consumption. Each standards based radio associated with an asset being tracked often operates from a battery that is included within the housing of the radio. The battery is able to effectively power the radio for only a short period of time. For example, a Bluetooth radio, whether of the class 1, 2, or 3 type, utilizes about 40 mAh of current when actively receiving transmissions. Even in standby mode, wherein the radio is neither receiving nor transmitting but is in a low power consumption mode from which it can quickly return to an active state, such a radio utilizes about 10 mAh of current. Bluetooth radios therefore can be expected to last less than about ninety (90) days, and only half that long in fairly active asset-tracking applications.

In view of the foregoing, it will be apparent that certain needs exist: for an improved low cost networking technology that has the benefits of the price and flexibility of standards based radios, but that overcomes the limited networking capacity of this technology; for more efficient methods of forming, organizing, and maintaining *ad hoc* wireless networks; and for a wireless data network technology that accommodates a large number of nodes, reduces RF interference, and consumes less power. A need also exists for a standards based radio device that consumes less power when awaiting the receipt of transmissions, thereby increasing the effective useful life of the radio device. The present invention addresses one or more of these needs.

SUMMARY OF THE PRESENT INVENTION

Several aspects of the invention are briefly described.

In a first aspect, a method of forming a wireless data communication network among a plurality of transceivers, particularly for tracking assets associated with the transceivers and/or for acquiring data from sensors associated with the transceivers, includes the steps of: assigning a common designation to a population of transceivers; selecting a primary transceiver from among the population of transceivers, the remainder of the population of transceivers being secondary transceivers; and forming a common designation, hierarchical *ad hoc* network among the population of transceivers.

Another aspect of the present invention includes forming a wireless data communication network among a plurality of transceivers by: assigning a first common designation to a first plurality of transceivers; assigning a second common designation to a second plurality of transceivers; and propagating first and second common designation, hierarchical *ad hoc* communication networks for transmitting data among the respective first and second pluralities of transceivers based on their respective common designations, the first hierarchical *ad hoc* communication network including a first root transceiver, and the second hierarchical *ad hoc* communication network including a second root transceiver.

Still another aspect of the present invention includes the forming of a hierarchical *ad hoc* network, comprising the steps of: assigning a first common designation or a second common designation to each of a plurality of wireless transceivers, each of the wireless transceivers including a digital processor, a memory, and a common designation network formation routine operable on the digital processor; and initiating the routines of the wireless transceivers to automatically propagate, in the absence of central control, a first hierarchical *ad hoc* network among the wireless transceivers of the first common designation and a second hierarchical *ad hoc* network among the wireless transceivers of the second common designation, the first hierarchical network automatically being organized so that it is logically distinct from the second hierarchical network.

Yet another aspect of the present invention relates to a dynamic distributed hierarchical database system. The dynamic distributed hierarchical database system includes a plurality of computer units each having a respective common designation. Each computer unit includes: a memory unit for storing a profile representative of its common designation; an *ad hoc* common designation network formation routine in communication with the memory for establishing a hierarchical *ad hoc* network with other computer units based on a shared common designation of the computer units; and a query handling routine for interpreting and responding to database queries received from an application server which database queries are directed to computer units sharing the particular common designation.

An additional aspect of the present invention pertains to a method of forming a wireless data communication network among transceivers, wherein each transceiver includes a designation with a first plurality of transceivers having a first common designation and a second plurality of transceivers having a second common designation different from the first common designation. The method includes the steps of: forming an *ad hoc* hierarchical class based network for each of the first plurality and second plurality of transceivers; and communicating to an external network from each transceiver of each ad hoc hierarchical class based network. Communication to the external network from each transceiver of each *ad hoc* hierarchical class based network is accomplished by establishing a communication link between each transceiver in a level of the *ad hoc* hierarchical common designation network, other than the highest level, with a transceiver in the next higher level of the *ad hoc* hierarchical common designation network such that transceivers pass communications upward in the *ad hoc* hierarchical common designation network; and establishing a communication link between a transceiver in the highest level of the *ad hoc* hierarchical common designation network and an external network access transceiver, such that communications from transceivers in the *ad hoc* hierarchical common designation network are passed through the transceiver in the highest level of the *ad hoc* hierarchical common designation network to the external network access transceiver.

Another aspect of the present invention relates to a method for communicating to a recipient transceiver from a plurality of transceivers, wherein the plurality of transceivers are located within the broadcast range of the recipient transceiver. The method comprising the steps of: transmitting a communication at a first power level such that only a first group of transceivers receive the broadcast, with the communication including a command causing each of the first group of transceivers not to respond to a subsequent broadcast; and subsequent thereto, transmitting a communication at a second power level greater than the first power level such that a second group of transceivers greater than and including the first group of transceivers receive the broadcast, but such that only a limited number of transceivers of the second group respond to the broadcast. The limited number of transceivers excludes the first group of transceivers.

In a feature of this aspect of the present invention, the plurality of transceivers actually exceeds the number of transceivers from which communications simultaneously can be received by the transceiver without radio frequency interference due to its channel capacity. In this case, the first group of transceivers comprises a number not greater than the number of transceivers from which communications can be received by the transceiver without radio frequency interference due to its channel capacity. The limited number of transceivers excludes the first group of transceivers and also otherwise comprises a number not greater than the number of transceivers from which communications can be received by the transceiver without radio frequency interference due to its channel capacity.

Still yet another aspect of the present invention pertains to a wireless transceiver that includes a low power radio frequency (LPRF) communications device capable of powering down to conserve energy and capable of powering up in response to an electronic signal. The wireless transceiver further includes, in accordance with the present invention, a second receiver that is physically connected to the input of the LPRF communications device and that provides the electronic signal for powering up the LPRF communications component in response to receipt by the second receiver of a radio frequency broadcast.

The wireless transceiver may be used to read wireless tags disposed externally to and in proximity of the wireless transceiver, in which case the wireless transceiver is referred to herein as a wireless reader tag (WRT). Consequently, in an aspect of the present invention, a WRT includes a low power radio frequency (LPRF) communications component capable of powering down to conserve energy and capable of powering up in response to an electronic signal. The LPRF communications component includes a receiver and a transmitter for two-way radio communications. The WRT also includes a second receiver physically connected to the input of the LPRF communications component. In response to receipt by the second receiver of a radio frequency broadcast, the second receiver provides the electronic signal in order to power up the LPRF communications component. Preferably, the LPRF communications component and second receiver are hardwired within a housing of the WRT. The WRT also may include, hardwired within the housing, a reader component for reading WTs disposed externally to and in proximity of the WRT. In such case, the reader component preferably is physically connected to the LPRF communications component for data exchange therebetween.

In another aspect of the present invention, a WRT, which can be used to read one or more WTs that are disposed externally to and in proximity of the WRT in response to a radio frequency broadcast, draws only on the order of approximately 10 to 15 microamps of electric current when awaiting for and receiving the radio frequency broadcast. Preferably, a LPRF communications component (which includes a receiver and a transmitter for two-way radio communications) and a second receiver are hardwired within a housing of the WRT. When included, a reader component also is hardwired within the WRT housing in physical connection with the LPRF communications component for data exchange therebetween.

In yet another aspect of the present invention, a method of manufacturing a WRT, which can be used to read one or more WTs disposed externally to and in proximity of the WRT, includes the step of hardwiring within a housing of the WRT: a low power radio frequency (LPRF) communications component capable of powering down to conserve battery power and capable of powering up in response to an electronic signal, wherein the LPRF communications component includes a receiver and a transmitter for two-way radio communications; and a second receiver physically connected to the input of the LPRF communications component, with the second receiver generating the electronic signal in order to power up the LPRF communications component in response to receipt by the second receiver of a radio frequency broadcast. The method also may include the step of hardwiring into the WRT housing a reader component for reading the WTs, with the reader component physically connected to the LPRF communications component for data exchange therebetween;

In certain preferred embodiments of the present invention, the WRT preferably draws on the order of only about 10 to 15 microamps of current when awaiting for and receiving the radio frequency broadcast. The LPRF communications component in particular draws on the order of about 40 mA of current when powered up; draws on the order of about 10 mA of current when powered down to a "standby" mode; and draws approximately no current when powered down to an "off" state. The LPRF communications component preferably comprises a Bluetooth radio or other standards based radio. The second receiver draws on the order of 15 microamps of electric charge when awaiting for and receiving the radio frequency broadcast.

In additional features of certain preferred embodiments, the second receiver provides the electronic signal by toggling a line connecting the second receiver with the LPRF communications component, and the LPRF communications device is programmed to power down when no longer actively transmitting or receiving. The second receiver provides power to the voltage regulators supplying power to the LPRF communications device causing it to power up or "boot up." The second receiver may be passive, i.e., have no energy source; however, the second receiver preferably includes a battery to increase its sensitivity and, thus, significantly increase the range within which it may detect a transmission over the range that it otherwise would have without use of an energy source.

A modified wireless tag may comprise the second receiver. Such a modified wireless tag preferably includes: a radio frequency detector component, a memory component, and an application specific integrated circuit (ASIC) component. Either the memory component or the ASIC component may stores an identification therein.

In this regard, the radio frequency broadcast, to which the second receiver responds by providing the electronic signal at the input of the LPRF communications device, preferably includes therein the identification that is stored within the WRT when the broadcast is intended to activate the WRT. Furthermore, the second receiver preferably responds to a radio frequency broadcast by providing the electronic signal at the input of the LPRF communications device only if the radio frequency broadcast includes the identification.

The identification itself may be permanently stored within the second receiver. The identification also may uniquely identify the WRT or, alternatively, the identification may represent a WRT class or a WT class. The identification may also represent a selected plurality of WRTs.

The second receiver preferably includes an antenna, which may be the same as or different from the antenna utilized by the LPRF communications component or different. The second receiver also preferably has an energy source, which may be the same as or different from the energy source utilized by the LPRF communications component.

The WRTs of certain embodiments of the present invention are preferably utilized in asset-tracking applications. The radio frequency utilized by the WRTs preferably is about 2.4 GHz. In this context, the WTs that are read by the reader components of the WRTs preferably are associated with the assets to be tracked, with each of these WTs comprising a radio-frequency transponder. Alternatively, WRTs themselves may be associated with assets to be tracked, thereby serving the function of WTs.

In accordance with one or more aspects of the present invention, the WRT may include a sensor component physically connected to the LPRF communications component for data exchange therebetween. The sensor component may include a motion detector; a digital camera; a microphone; a thermometer; and/or a global positioning system (GPS) receiver.

In accordance with one or more aspects of the present invention, the WRT further may include an external network communications component physically connected to the LPRF communications component for data exchange therebetween. In this regard, the external network communications component may comprise a satellite transceiver and/or a cellular transceiver.

In yet another aspect, an asset-tracking system utilizes one or more of the foregoing WRTs in accordance with the present invention, including a method of forming an *ad hoc* hierarchical data communication network utilizing one or more WRTs. Such an asset-tracking system also preferably utilizes class-based, *ad hoc* hierarchical networks.

In a method of forming a wireless data communication network among WRTs in accordance with the foregoing, each WRT includes a designation with a first plurality of WRTs having a first common designation and a second plurality of WRTs having a second common designation different from the first common designation. The method includes the steps of: forming an *ad hoc* hierarchical network for each of the first plurality and second plurality of WRTs; and communicating to an external network from each WRT of each *ad hoc* hierarchical network by, (i) establishing a communication link between each WRT in a level of the *ad hoc* hierarchical network, other than the highest level, with a WRT in the next higher level of the *ad hoc* hierarchical network such that WRTs pass communications upward in the *ad hoc* hierarchical network; and (ii) establishing a communication link between a WRT in the highest level of the *ad hoc* hierarchical network and an external network access transceiver, such that communications from WRTs in the *ad hoc* hierarchical network are passed through the WRT in the highest level of the *ad hoc* hierarchical network to the external network access transceiver.

In another method of forming a wireless data communication network among WRTs in accordance with the foregoing, each WRT includes a class designation with a first plurality of WRTs having a first class designation and a second plurality of WRTs having a second class designation different from the first class designation. The method includes the steps of: forming an *ad hoc* hierarchical class-based network for each of the first plurality and second plurality of WRTs; and communicating to an external network from each WRT of each *ad hoc* hierarchical class-based network by, (i) establishing a communication link between each WRT in a level of the *ad hoc* hierarchical class-based network, other than the highest level, with a WRT in the next higher level of the *ad hoc* hierarchical class-based network such that WRTs pass communications upward in the *ad hoc* hierarchical class-based network; and (ii) establishing a communication link between a WRT in the highest level of the *ad hoc* hierarchical class-based network and an external network access transceiver, such that communications from WRTs in the *ad hoc* hierarchical class-based network are passed through the WRT in the highest level of the *ad hoc* hierarchical class-based network to the external network access transceiver. The step of forming an *ad hoc* hierarchical class-based network for each of the first plurality and second plurality of WRTs preferably includes the steps of: filtering, by each WRT, transmissions from other WRTs for an identification of its class designation within the transmission; transmitting, from a primary WRT of the first plurality, a primary availability signal including an identification of the first class designation and an identification of the primary WRT transmitting the primary availability signal; transmitting, from a primary WRT of the second plurality, a primary availability signal including an identification of the second class designation and an identification of the primary WRT of the second plurality transmitting the primary availability signal; transmitting, from a WRT receiving a primary availability signal having an identification therein of its class designation, a registration signal including an identification of the class designation and an identification of the WRT transmitting the registration signal; and identifying a WRT transmitting a registration signal as a secondary WRT by a primary WRT of the same class designation, the primary WRT thereby assuming a higher level in the *ad hoc* hierarchical class-based network relative to the said identified secondary WRT such that communication from the secondary WRT to the external network is passed to the primary WRT.

A method for communicating to a WRT in accordance with the foregoing from WTs located within the broadcast range of the WRT includes the steps of: transmitting by the WRT a communication at a first power level such that only a first group of the WTs receive the broadcast, the communication including a command causing each of the first group of WTs not to respond to a subsequent broadcast; and subsequent thereto transmitting by the WRT a communication at a second power level greater than the first power level such that a second group of WTs greater than and including the first group of WTs receive the broadcast, but such that only a limited number of WTs of the second group respond to the broadcast, the limited number of WTs excluding the first group of WTs.

A second method for communicating to a WRT in accordance with the foregoing from WTs located within the broadcast range of the WRT applies to the situation wherein the WTs exceed the number of WTs from which communications ordinarily can be received by the WRT without radio frequency interference due to its channel capacity. In this regard, the method includes the steps of: transmitting by the WRT a communication at a first power level such that only a first group of the WTs receive the broadcast, the first group in number of WTs being not greater than the number of WTs from which communications can be received by the WRT without radio frequency interference due to its channel capacity, the communication including a command causing each of the first group of WTs not to respond to a subsequent broadcast; and subsequent thereto transmitting by the WRT a communication at a second power level greater than the first power level such that a second group of WTs greater than and including the first group of WTs receive the broadcast, but such that only a limited number of WTs of the second group respond to the broadcast, the limited number of WTs excluding the first group of WTs and comprising not greater than the number of WTs from which communications can be received by the WRT without radio frequency interference due to its channel capacity.

BRIEF DESCRIPTION OF THE DRAWINGS

Further aspects, feature, benefits, and advantages of the present invention will be apparent from a detailed description of preferred embodiments of the present invention taken in conjunction with the following drawings, wherein similar elements are referred to with similar reference numbers, and wherein:

FIGS. 3–11 illustrate a time sequence that depicts Wireless Reader Tags of arbitrary classes "circle" and "triangle," transmitting a series of messages in the course of self-organizing a hierarchical network using a bottom-up propagation approach.

FIGS. 6A, 8A, 9A, 10A, and 11A illustrate the topology of the ad hoc network formed at the stages depicted in corresponding FIGS. 6, 8, 9, 10, and 11, respectively.

FIGS. 12–21A illustrate a time sequence of ad hoc network formation using a top-down propagation approach.

FIG. 26 comprises Table 1 referenced below.

FIG. 27 comprises Table 2 referenced below.

DETAILED DESCRIPTION OF PREFERRED EMBODIMENTS

Figure 1:
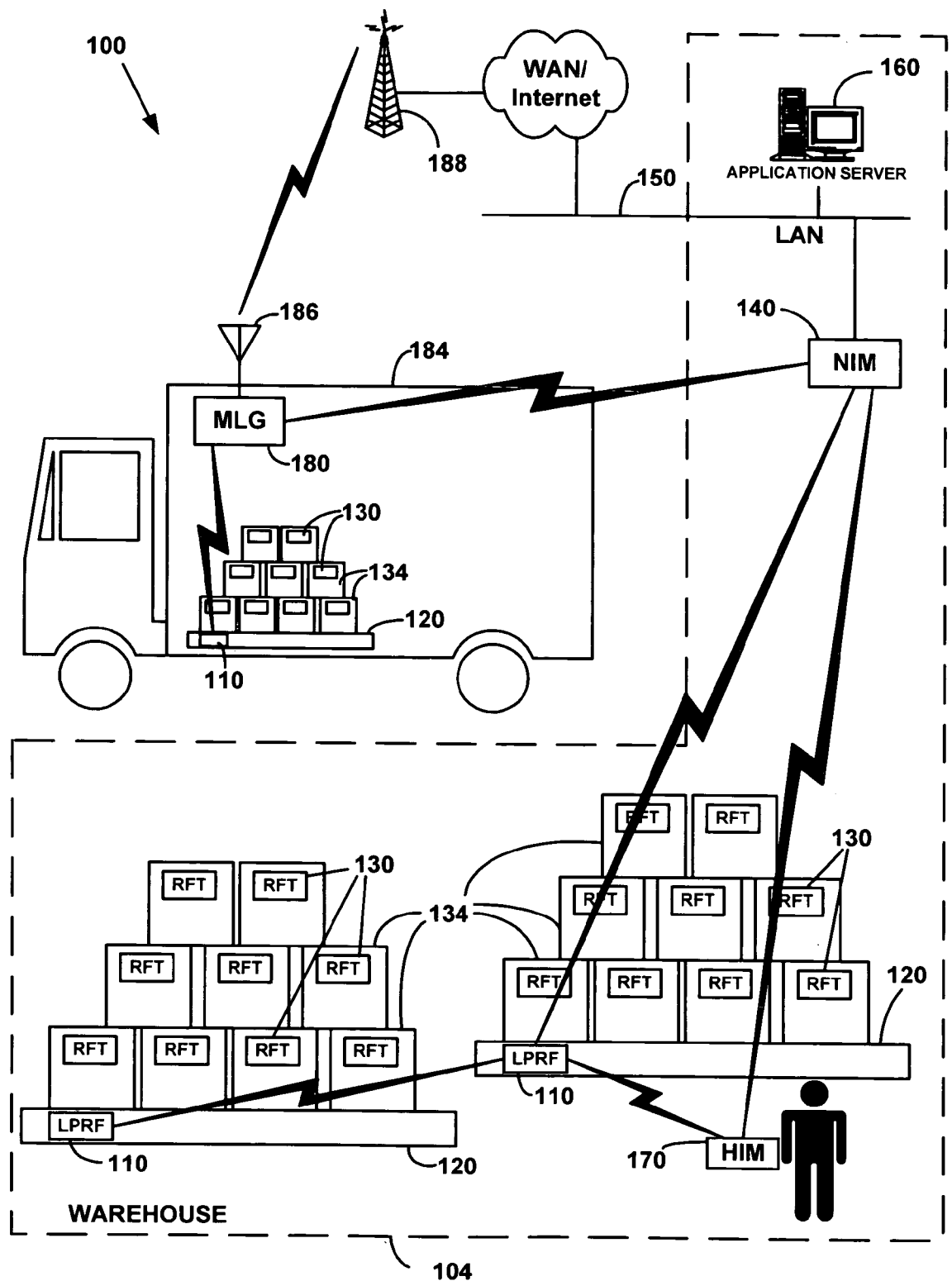
FIG. 1 illustrates various network components and an example arrangement in the context of a warehouse application in accordance with the present invention.

As a preliminary matter, it will readily be understood by those persons skilled in the art that the present invention is susceptible of broad utility and application in view of the following detailed description of the preferred devices and methods of the present invention. Many devices, methods, embodiments, and adaptations of the present invention other than those herein described, as well as many variations, modifications, and equivalent arrangements, will be apparent from or reasonably suggested by the present invention and the following detailed description thereof, without departing from the substance or scope of the present invention. Accordingly, while the present invention is described herein in detail in relation to preferred devices, methods and systems, it is to be understood that this disclosure is illustrative and exemplary and is made merely for purposes of providing a full and enabling disclosure of the preferred embodiments of the invention. The disclosure herein is not intended nor is to be construed to limit the present invention or otherwise to exclude any such other embodiments, adaptations, variations, modifications and equivalent arrangements, the present invention being limited only by the claims appended hereto and the equivalents thereof.

Preferred embodiments of the present invention relate to asset tracking and/or monitoring. Other preferred embodiments relate to providing a remote sensor interface (RSI) network for the receipt and communication of sensor-acquired data. The RSI network may be utilized in conjunction with asset tracking and/or monitoring, in which case the sensor-acquired data may relate to information obtained from sensors associated with the assets being tracked and/or monitored. The following detailed description relates primarily to asset tracking and/or monitoring, but equally disclose the RSI networks of the present invention whether used in asset tracking and/or monitoring, or otherwise.

Accordingly, with regard to asset tracking and monitoring, each asset to be tracked preferably is tagged with a wireless transceiver (hereinafter referred to as a "Wireless Tag" or "WT") and reading the Wireless Tag using another wireless transceiver (hereinafter referred to as a "Wireless Reader Tag" or "WRT").

The Wireless Tag itself preferably is semi-passive, although a passive, active, or other type of Wireless Tag could be used within the scope of the present invention. The Wireless Reader Tag itself preferable is active. A passive transceiver, such as an RFID tag, receives and transmits primarily using inductive energy. A semi-passive transceiver receives primarily using inductive energy and transmits using internally stored energy, such as a battery. An active transceiver receives and transmits using internally stored energy, such as a battery.

In the preferred embodiments, the Wireless Tags are radio-frequency transponders ("RFTs"), and the Wireless Reader Tags are wireless transceivers generally comprising low-power radio frequency ("LPRF") devices capable of transmitting and receiving data packets. As used herein, a LPRF device refers generally to a two-way wireless radio-frequency data communication device that transmits data in packets, and is not limited to a particular signal strength or power consumption.

Each Wireless Tag includes a unique identification (hereinafter "WT ID") stored therein that uniquely identifies the Wireless Tag in transmissions made by the Wireless Tag and, likewise, each Wireless Reader Tag includes a unique identification (hereinafter "WRT ID") stored therein that uniquely identifies the Wireless Reader Tag in transmissions made by the Wireless Reader Tag.

The Wireless Reader Tags preferably operate in accordance with standards based radios and especially with Bluetooth standards—an industry wide wireless radio specification. However, it should be understood that the invention is not limited to use with Bluetooth technology, but can be used with any wireless transceiver having the capability to communicate directly with other wireless transceivers, such as wireless Ethernet transceivers, 802.11, Home RF, and others.

In accordance with the present invention, each Wireless Tag also includes, apart from its WT ID, a "class designation" representative of an attribute, characteristic, relation, or behavior of the asset (and not the Wireless Tag itself), and each Wireless Tag is said to belong to, or be a member of, a particular WT Class based on its class designation. Identification of the WT Class for which a particular Wireless Tag is designated preferably is stored on the Wireless Tag and is utilized by the Wireless Tag in screening broadcasts for determining whether to respond thereto with a transmission.

The WT Class may represent any type of identification, as desired. For instance, a particular WT Class could represent a category of an asset, such as a ball (identified by /ball); a subcategory such as a soccer ball (identified by /soccer_ball); or a subcategory of the subcategory (a sub-subcategory), such as a size 5 soccer ball (identified by /size_5_soccer_ball). When the WT Class represents a subcategory or sub-category, for example, the WT Class may also represent the category or subcategory, respectively, abstracted from the subcategory or sub-category. Thus, a WT Class representing a sub-subcategory equal to /ball/soccer_ball/size_5_soccer_ball also inherently identifies a subcategory (soccer_ball) and a category (ball). Alternatively, the a WT Class may be intentionally limited to identification only of the sub-subcategory (/size_5_soccer_ball). If so limited, additional information inferred from this identification about the subcategory and/or category of such WT Class then may be maintained in memory on the Wireless Reader Tag (described below) or remotely in category dictionaries or category rule sets.

When a broadcast or multicast is made to the Wireless Tags (hereinafter "WT Broadcast"), each Wireless Tag is capable of identifying a specified WT Class in the WT Broadcast and replying to the WT Broadcast with its own transmission when the specified WT Class matches its WT Class. If the WT Class does not match its class designation, then the Wireless Tag does not respond to the WT Broadcast and it makes no transmission. In this regard, each Wireless Tag is a transponder that may be selectively activated. Semi-passive transceivers that are capable of being used to respond to targeted broadcasts in accordance with the present invention, and not to every broadcast received, are well known within the art and, accordingly, the specific design of such semi-passive transceivers forms no part of the present invention.

Each Wireless Reader Tag also includes a class designation, and each Wireless Reader Tag is said to belong to, or be a member of, a WRT Class. Preferably each Wireless Reader Tag is associated with at least one WT Class for reading Wireless Tags that are members thereof. In this regard, the Wireless Reader Tag communicates with (or "reads") those Wireless Tags having a WT Class with which it is associated by making a WT Broadcast specifying the WT Class in the transmission. The identification of associated WT Classes of a Wireless Reader Tag preferably is preprogrammed into the memory of, or otherwise maintained in, the Wireless Reader Tag. Active transceivers that are capable of being used to make broadcasts that identify targeted semi-passive transceivers for response are well known within the art and, accordingly, the specific design of such active transceivers forms no part of the present invention. Preferably, however, each Wireless Reader Tag includes a digital processor and memory for storing the WRT Class thereof and associated WT Classes, the members of which are to be read by the Wireless Reader Tag.

Preferred embodiments of each WRT in accordance with certain aspects of the present invention are disclosed in further detail below under the heading "Preferred WRT Architecture."

In one aspect of the invention, a class adoption step also is utilized in which a WRT Class is adopted by a Wireless Reader Tag that is detected as being the WRT Class of a nearby Wireless Reader Tag, or that is associated with a detected WT Class of a nearby Wireless Tag. Typically, such class adoption is performed only when the adopting Wireless Reader Tag is unable to participate in the *ad hoc* hierarchical network formation because of a missing or corrupted class designation. Moreover, in some circumstances such a class adoption step may be useful even if the adopting Wireless Reader Tag has sufficient class designation information to support communication. For example, a Wireless Reader Tag attached to a pallet could periodically update its class designation by detecting the WRT Classes of nearby Wireless Reader Tags and the corresponding WT Classes of nearby Wireless Tags (e.g., those attached to items placed on a pallet). Alternatively a Wireless Reader Tag can be manually programmed with a class designation by use of a handheld communicator (hereinafter "Communicator"). The Communicator is a sort of remote control device that allows a human operator to program Wireless Reader Tags and to query Wireless Tags. Preferably, the Communicator includes a LPRF device that is controlled by application software designed to facilitate manual human interaction and communication with nearby Wireless Reader Tags and Wireless Tags. In preferred embodiments, the Communicator comprises a PDA, such as those available from Palm Corp., that is appropriately configured for use with the present invention.

In reading Wireless Tags, a Wireless Reader Tag is capable of communicating with a limited number of Wireless Tags at any given time. Accordingly, if a large number of Wireless Tags are to be read by a particular Wireless Reader Tag, the Wireless Tags are read using a step-power filtering routine in accordance with the present invention. In this regard, a Wireless Reader Tag is capable of transmitting at different power levels. By transmitting a different consecutive power levels, a Wireless Reader Tag may read a large number of Wireless Tags that otherwise would not be read due to RF interference.

Figure 22:
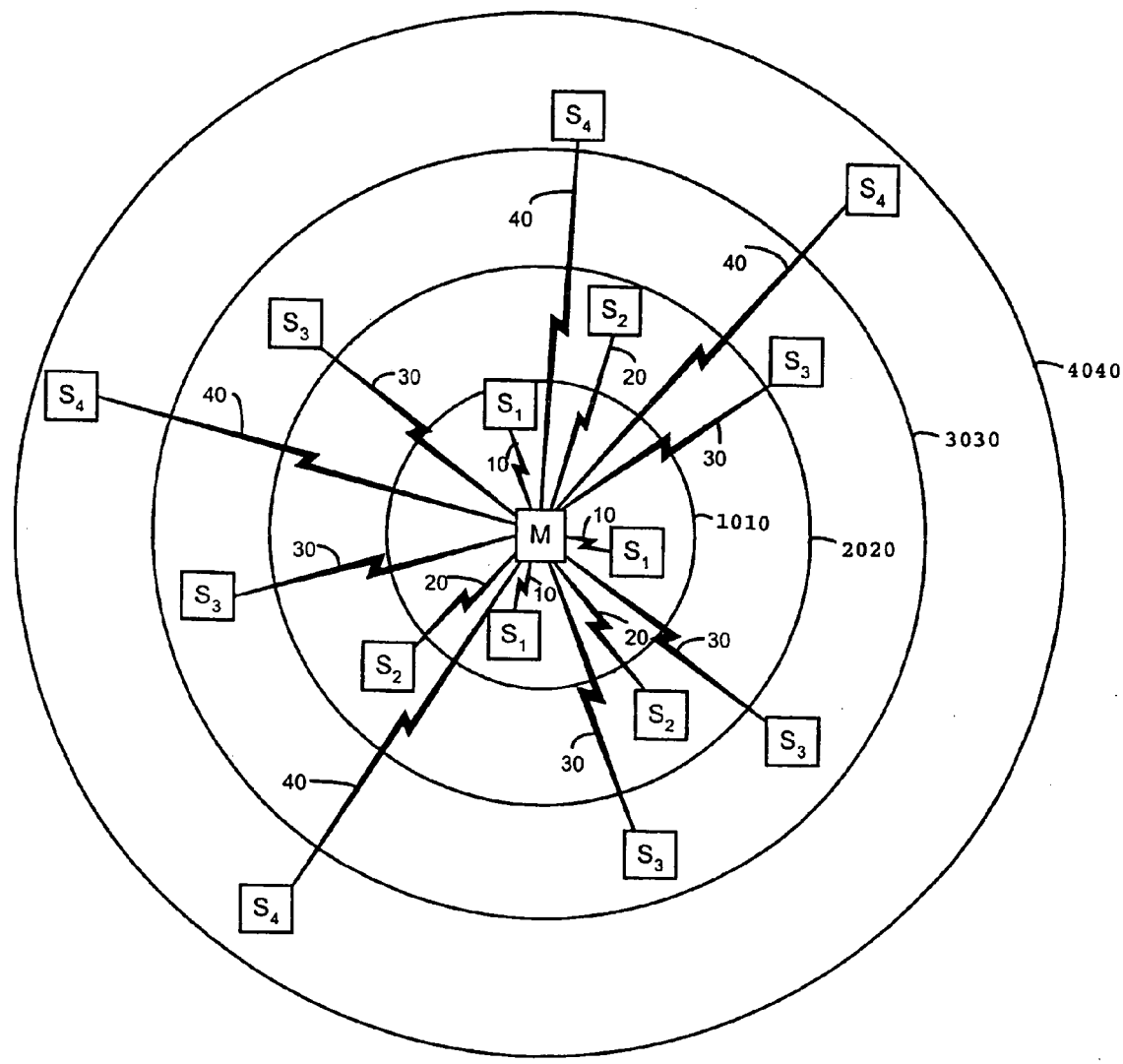
FIG. 22 illustrates a step-power filtering routine utilized by a Wireless Reader Tag in accordance with the present invention.

With reference to FIG. 22, a Wireless Reader Tag "M" is shown spaced at different distances to Wireless Tags $S_1$, $S_2$, $S_3$, $S_4$. In accordance with the step-power filtering routine, the Wireless Reader Tag broadcasts at a first power level 10 a transmission specifying the WT Class of all of the illustrated Wireless Tags S. The broadcast is received by the closest three Wireless Tags shown within the inner circle 1010, which represents the effective transmission range of the Wireless Reader Tag at the first power level. The broadcast includes, inter alia, a command to ignore subsequent transmission specifying the same WT Class within a predetermined time period thereafter. The Wireless Tags receiving this transmission then respond appropriately and power down for the predetermined time period.

Next, the Wireless Reader Tag broadcasts at a second, stronger power level 20 a transmission specifying the same WT Class. The broadcast is received by the closest six Wireless Tags shown within the inner circle 2020, which represents the effective transmission range of the Wireless Reader Tag at the second power level. The broadcast includes, inter alia, a command to ignore subsequent transmission specifying the same WT Class within a predetermined time period thereafter. The three outermost Wireless Tags $S_2$ receive this transmission, respond appropriately, and then power down for the predetermined time period. The innermost Wireless Tags $S_1$ do not respond, as each has previously been instructed to ignore this subsequent transmission.

This process then repeat two more times, whereby all fifteen Wireless Tags have been read. Specifically, the Wireless Reader Tag next broadcasts at a third, stronger power level 30 a transmission specifying the same WT Class. The broadcast is received by the closest eleven Wireless Tags shown within the inner circle 3030, which represents the effective transmission range of the Wireless Reader Tag at the third power level. The broadcast includes, inter alia, a command to ignore subsequent transmission specifying the same WT Class within a predetermined time period thereafter. The five outermost Wireless Tags $S_3$ receive this transmission, respond appropriately, and then power down for the predetermined time period. The innermost Wireless Tags $S_1$, $S_2$ do not respond, as each has previously been instructed to ignore this subsequent transmission.

Finally, the Wireless Reader Tag next broadcasts at a fourth, yet stronger power level 40 a transmission specifying the same WT Class. The broadcast is received by all Wireless Tags shown within the inner circle 4040, which represents the effective transmission range of the Wireless Reader Tag at the fourth power level. The broadcast includes, inter alia, a command to ignore subsequent transmission specifying the same WT Class within a predetermined time period thereafter. The four outermost Wireless Tags $S_4$ receive this transmission, respond appropriately, and then power down for the predetermined time period. The innermost Wireless Tags $S_1$, $S_2$, $S_3$ do not respond, as each has previously been instructed to ignore this subsequent transmission. In an alternative step-power filtering technique, the power level of the broadcast is included in the transmission. Then, as each Wireless Tag receives the broadcast, the power level is noted and a range thereof is used with the WT Class for prescreening of further transmissions. In this regard, only those transmissions falling within the predetermined range about the power level of the broadcast are received and processed by the particular Wireless Tags. Thereafter, a "reset" command is broadcast to all of the Wireless Tags in order to enable receipt thereafter of a broadcast at any power level, or alternatively, the power level screening is dropped after a predetermined time period.

The WRT class designations primarily are used by Wireless Reader Tag to screen each broadcast or multicast intended for receipt by a particular class of Wireless Reader Tags (hereinafter "WRT Broadcast"). Typically, a command, query, or the like (generically referred to as a message) is communicated in a transmission to members of a WRT Class in a WRT Broadcast as part of a data packet that begins with a preamble including an identification of the WRT Class intended as the target of the broadcast. Other information may also be included in the data packet for screening purposes by each Wireless Reader Tag. Wireless Reader Tags within range of the WRT Broadcast awake from a standby mode to receive the data packet, but only process the message therein with possible transmissions in response thereto when the WRT Class of the preamble matches the WRT Class of the Wireless Reader Tag (and when the other screening information, if present, also is matched). If there is no match, then the particular Wireless Reader Tag does not process the message, drops the data packet, and returns to standby mode.

A Wireless Reader Tag or a Wireless Tag also may store in memory additional information such as: sensor derived information (e.g., temperature, humidity, altitude, pressure); a priority designation to provide improved response to selected broadcasts; a privilege level (e.g., "visitor," "employee," "manager," "administrator," and "super user"); time-sensitive information (e.g., synchronization timing, real-time sensor data, and GPS data); a characteristic of the particular tagged asset (e.g., serial number, status, process step, physical location, color, size, density); and/or a behavior of the tagged asset (e.g., temperature sensitivity, light sensitivity, shelf life). A Wireless Reader Tag also may store a WRT rank in a hierarchical *ad hoc* network formed by the Wireless Reader Tags (e.g., "primary" or "master," "secondary" or "slave," "sub-primary," "tertiary"); and/or an identification of the WT Class for which a particular Wireless Tag is designated, indexed by WT ID for the particular Wireless Tag, especially if the Wireless Tag can store only the WT ID (e.g., when the Wireless Tag is passive).

Preferred WRT Architecture

Whether utilized in asset-tracking applications, sensor derived information gathering, or otherwise, the preferred WRT architecture significantly prolongs the useful life of a WRT.

Figure 23:
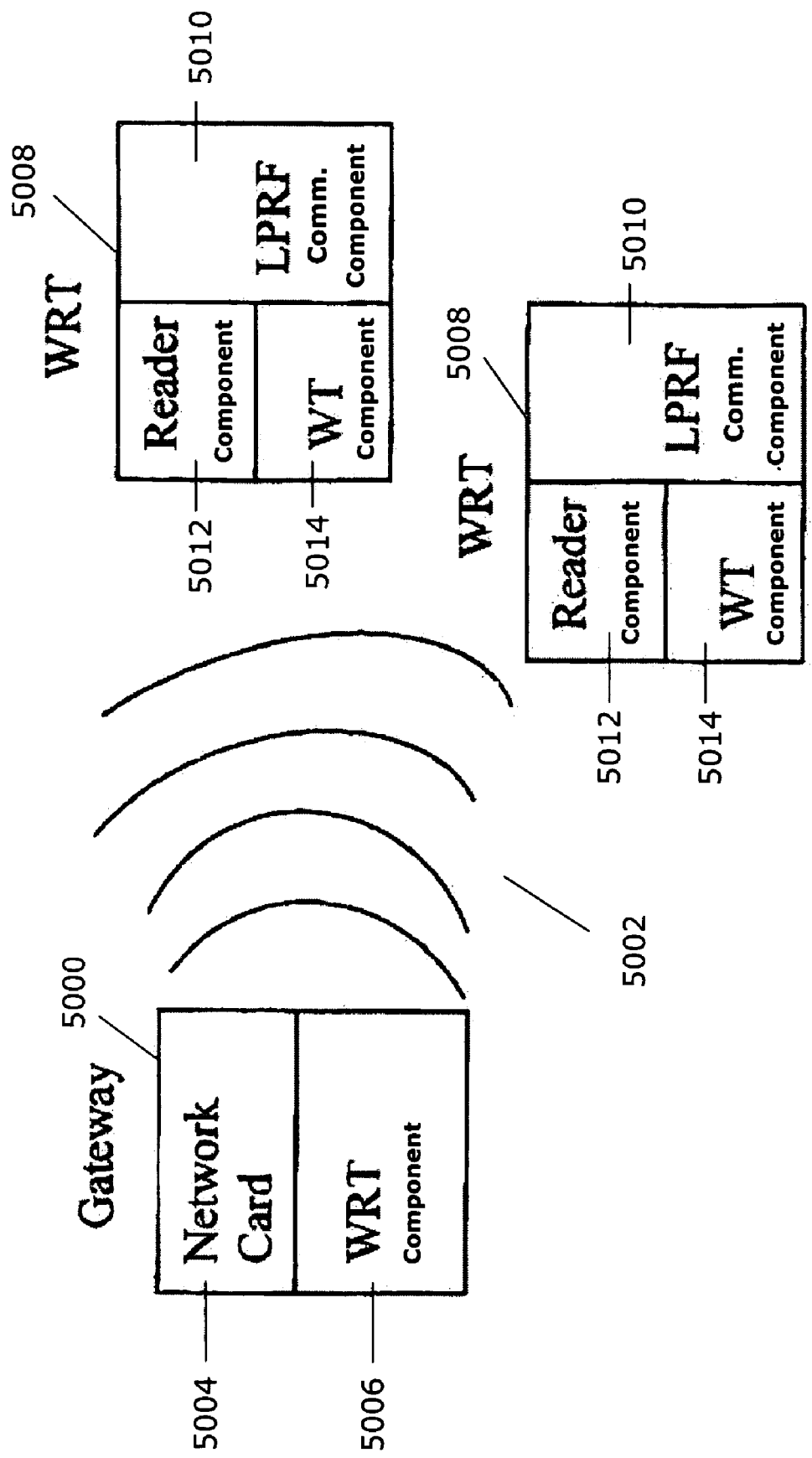
FIG. 23 illustrates in block diagram a Gateway making a WRT Broadcast to a plurality of WRTs in accordance with a preferred embodiment of the present invention.

In this regard, FIG. 23 illustrates in block diagram a Gateway 5000 making a WRT broadcast 5002 to a plurality of WRTs 5008 in accordance with the present invention. As discussed in greater detail below with reference to network formation, the Gateway 5000 represents the juncture between the networks formed by the WRTs 5008 and an external network, such as the Internet. Specifically, the Gateway 5000 is the Network Interface Module ("NIM") in FIG. 23 providing the wireless interface into the radio network of and controlling the messaging to the WRTs 5008. In this regard, the Gateway 5000 preferably includes software allowing it make broadcasts to and communicate with the WRTs 5008. In such communications, the Gateway 5000 preferably sends out a low frequency message in the band of the LPRF communications component 5010 of the WRTs 5008 (described in detail below). The message m(t) preferably is modulated on a carrier frequency, and the m(t) is likely to have a bias (k) due to the other radio communications in the same band. The m(t) will significantly reduce false turn on and provide the mechanism to wake the radios based on an object identifier, name, or classification (as described in detail below, once the WT component in the WRT receives the proper message from the Gateway, the WT component "wakes up" the LPRF communications component in the WRT).

In forwarding communications between the external network and the radio network of the WRTs 5008, the Gateway 5000 translates a radio link protocol to Ethernet, PSTN (Public Switched Telephone Network), Mobile Phones (including GSM, TDMA, CDMA, PDC, AMPS, Ricochet, etc.) and other data communications networks that allows the information to be transferred to a database on the Internet or an Intranet. The Gateway 5000 thus serves an external network communications function, providing the WRTs 5008 with an avenue for communication to external devices connected to the Internet.

Referring again to FIG. 23, the Gateway 5000 itself preferably includes a network card component 5004 for interfacing with the external network using the appropriate protocols and a WRT component 5006 for communicating with the WRTs 5008 using the appropriate protocols. The WRT component 5006 interfaces to the network card 5004, and the WRT component 5006 preferably comprises a LPRF communications component, such as a class 1 Bluetooth radio, for communicating directly with the LPRF communications component of each WRT 5008, as described in greater detail below. Furthermore, the WRT component 5006 may further include a receiver circuit for performing the "tag turn-on" function of the present invention, in which case the Gateway 5000 may power off when not in use and be awaken by an appropriate broadcast when communication by way of the Gateway 5000 is desired. This is especially advantageous when the Gateway 5000 itself is powered by an internal energy source, such as a battery.

Figure 24:
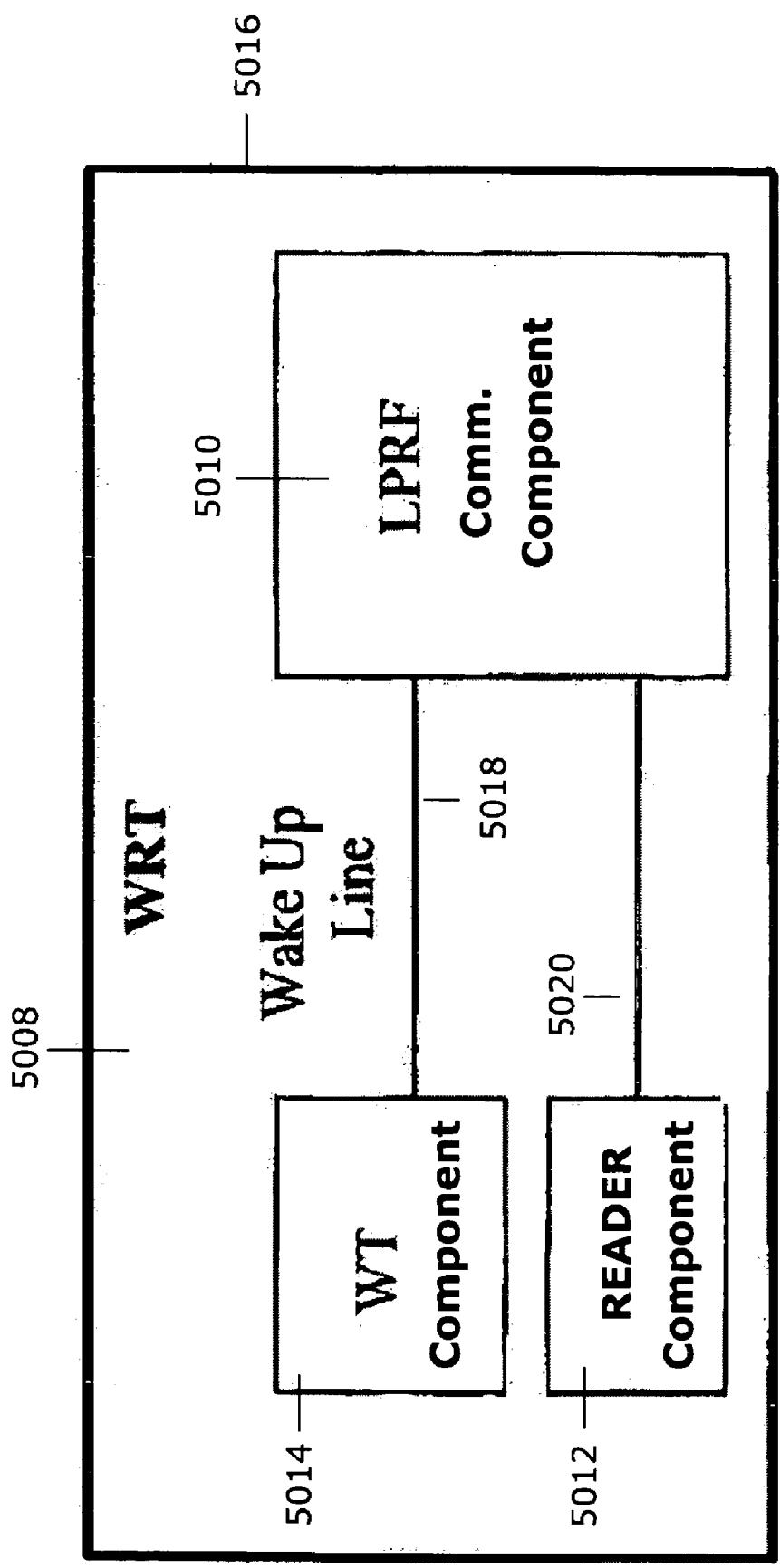
FIG. 24 illustrates in block diagram a preferred architecture of a WRT of FIG. 23.

Each WRT 5008 shown in FIG. 23 preferably is an active transceiver and includes several components. Specifically, with reference to FIG. 24, each of the WRTs 5008 includes a LPRF communications component 5010, a reader component 5012 physically connected to the LPRF communications component 5010 for data exchange therebetween, and a WT component 5014 physically connected to an "activation" input of the LPRF communications component 5010 for performing the "tag turn-on" function of the present invention. These components are hardwired into the WRT housing 5016 of the WRT 5008. In this hardwiring, the WT component 5014 is physically connected to the activation input of the LPRF communications component 5010 by line 5018, and the reader component 5012 is physically connected to the LPRF communications component 5010 by line 5020. Each WRT 5008 also includes an energy source, such as a battery (not shown), as well as an antenna (not shown).

The reader component 5012 preferably is connected to the LPRF communications component 5010 through a serial port of the LPRF communications component 5010. Furthermore, the reader component 5012 preferably comprises an RFID tag reader for reading WTs that comprise RFID tags. However, in alternative preferred embodiments, if the WTs to be read comprise standards based radios, such as class 1 or class 2 Bluetooth radios, then the LPRF communications component 5010 itself is capable of communicating directly with the WTs, and the reader component 5012 need not even be included in the WRT 5008.

Figure 25:
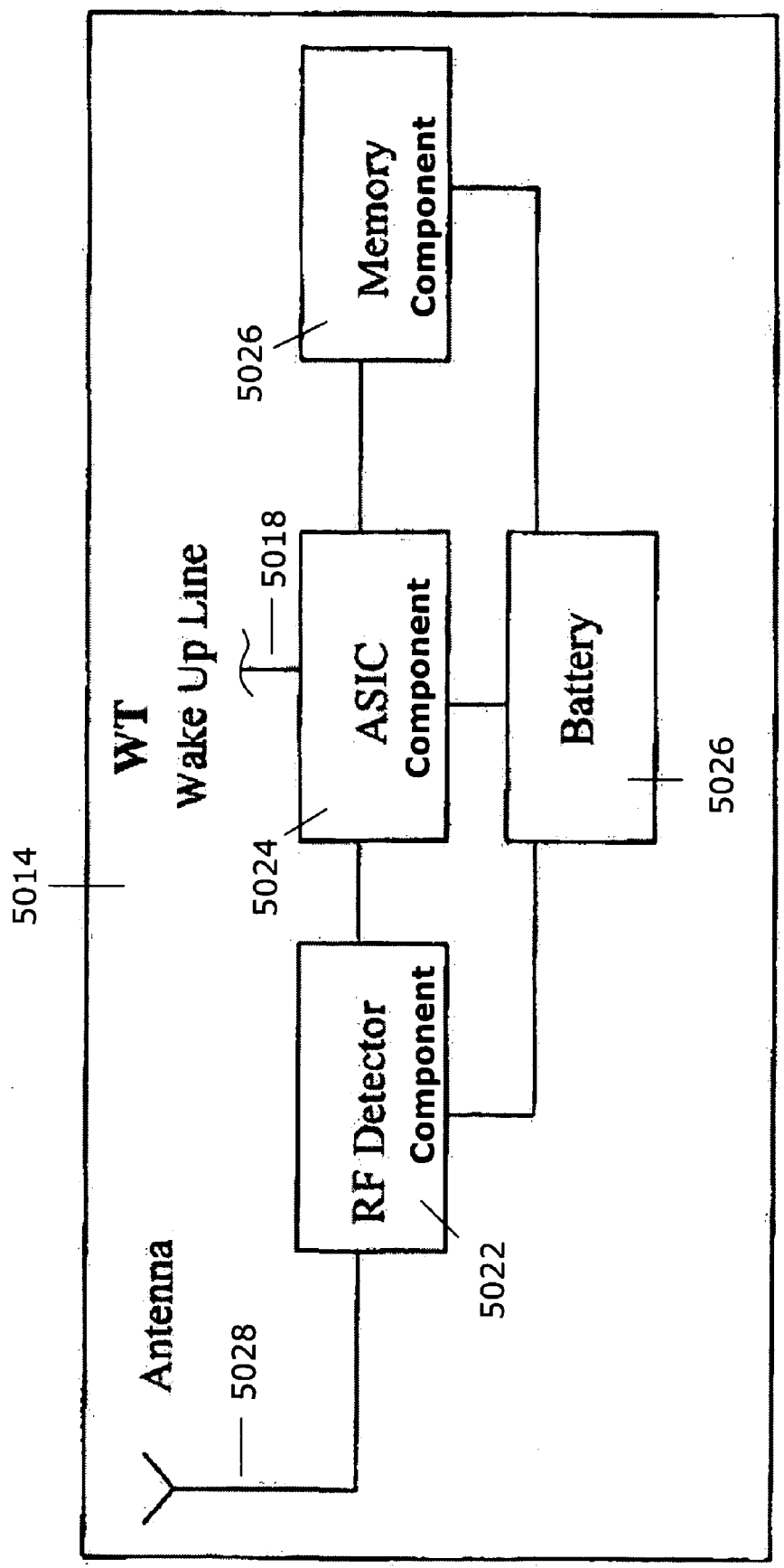
FIG. 25 illustrates in block diagram a preferred architecture of the WT component of the WRT of FIG. 24.

The WT component 5014 itself, like the WRT 5008, includes several components. As shown in FIG. 25, these components include a radio frequency (RF) detector component 5022, an application-specific integrated circuit (ASIC) component 5024, and a memory component 5026. The WT component 5014 also includes an energy source, such as a battery 5026, as well as an antenna 5028. The antenna 5028 of the WT component 5014 and/or the battery 5026 of the WT component 5028 may be shared with the LPRF communications component 5008. Alternatively, the antenna 5028 and/or the battery 5026 may be independent from that of the LPRF communications component 5008.

In variations of preferred embodiments, and in further accordance with the present invention, a WRT may include an external network communications component physically connected to the LPRF communications component for data exchange therebetween. In this regard, the NIM may comprise a satellite transceiver and/or a cellular transceiver, and the LPRF communications component preferably includes a port for interfacing with the satellite transceiver and/or cellular transceiver. If the WRT includes an external communications component, then the WRT may directly communicate with an external network without relaying communications through the Gateway.

The WRT additionally, or alternatively, may include a sensor component physically connected to the LPRF communications component by way of an appropriate port for data exchange therebetween. The sensor component may include a motion detector; a digital camera; a microphone; a temperature gauge; a thermistor; a vibration sensor; and/or a global positioning system (GPS) receiver. By including the sensor component as part of the WRT, data obtained from the sensor component can be communicated from the WRT by selectively activating the WRT and sending a query command to the WRT regarding the desired sensor information. The WRT also may be programmed to transmit an alert or other communication based upon the occurrence of predetermined sensor derived information.

In operation, the LPRF communications component 5010 communicates with the reader component 5012 in reading WTs located within the vicinity of the WRT 5008, and the LPRF communications component 5010 receives and transmits data to other WRTs 5008 or to a Gateway 5000 (specifically, the WRT component 5006 of the Gateway 5000). Furthermore, the LPRF communications component 5010 preferably is programmed to power down to an "off" state in order to conserve battery power when the LPRF communications component 5010 no longer is actively transmitting or receiving data packets. The LPRF communications component 5010 also may be capable of powering down to a standby mode, in which case the LPRF communications component 5010 preferably includes a timer circuit or other microprocessor that automatically controls powering up after a predetermined period of time has elapsed since powering down to the standby mode.

The WT component 5014 physically connected to the activation input of the LPRF communications component 5010 provides the electronic signal for waking up, i.e., activating, the LPRF communications component 5010. In this regard, the WT component 5014 generates this electronic signal by toggling the line 5018 that runs from the WT component 5014 to the LPRF communications component 5010 in response to receipt by the WT component 5014 of a radio frequency broadcast.

Furthermore, in accordance with the present invention, the radio frequency broadcast to which the WT component 5014 responds is a "targeted" broadcast. In this respect, the broadcast preferably includes in a preamble thereof one or more target identifications. The targeted broadcast that awakens a particular WRT may originate from a Gateway, such as Gateway 5000 of FIG. 23. The targeted broadcast may also originate from or be rebroadcast by the LPRF communications component of another WRT 5008.

The WT component 5014 preferably stores (in read only or read/write memory) an identification in its memory component 5026 and/or permanently stores an identification in the integrated circuits of its ASIC component 5024, and when a broadcast is received, the WT component 5014 screens or filters the broadcast to determine if the target identification in the broadcast matches the identification stored in the WT component 5014. If there is no match, the WT component 5014 does not awaken the LPRF communications component 5010 and continues to await a broadcast containing a matching identification.

On the other hand, a match results in the WT component 5014 generating the electrical signal by toggling the line 501 8, which awakens the LPRF communications component 5010. The WT component 5014 responds to a radio frequency broadcast in this manner preferably only if the radio frequency broadcast includes a target identification matching its stored identification. The stored identification itself may uniquely identify its WRT or, alternatively, the identification may represent a WRT class or a WT class. The identification also may represent a selected plurality of WRTs such that specific WRTs respond out of the total possible WRTs that otherwise could respond.

It thus will be apparent that, in its simplest form, the WT component need only comprise at a minimum a "receiver" circuit, as the WT component need only receive incident RF energy and be capable of responding by providing the electronic signal to wake up the LPRF communications component. Such a receiver circuit is common, and is found, for example, in the simple and inexpensive Frequency-Shift-Key (FSK) radios, Phase-Modulated (PM) radios, and Amplitude-Modulated (AM) radios.

In commercial practice, for example, the WT component could comprise a simple RFID tag modified to provide the wake up signal to the LPRF communications component. Such a wireless tag in standard operation "chirps" in response to receipt of incident RF energy, and the RFID tag would only need to be modified in order to channel the energy otherwise used for the "chirp" to the input of the LPRF communications component in order to wake it up. The present invention thus provides a method of using "wireless tag technology" (i.e., the receiver circuit of wireless tags) to wake the LPRF communications component when communication needs to commence.

It further will be apparent that a characteristic of a wireless transceiver of the present invention, such as a preferred WRT, includes two receivers and at least one transmitter. A receiver and transmitter pair is included in the LPRF communications component, and a second receiver is included in the WT component. Additionally, the range at which the second receiver is capable of detecting transmissions is at least approximately commensurate with the range at which the transmitter is capable of sending transmissions.

The advantages of this arrangement originates from the power consumption of the LPRF communications component (the transmitter/receiver pair) while awaiting receipt of transmissions versus that of the WT component (the second receiver). The LPRF communications component, which preferably comprises a Bluetooth radio, draws on the order of approximately 40 mA of current when awaiting receipt of a radio frequency broadcast and draws on the order of approximately 10 mA of current when powered down to a standby mode. The LPRF communication component draws approximately no current when powered down to an off state. In contrast, the WT component comprises at least a receiver circuit that only draws on the order of approximately 10 to 15 microamps of current while awaiting receipt of the radio frequency broadcast. Consequently, with the LPRF communications component powered off, the WRT overall draws only on the order of approximately 10–15 microamps of current attributable to the WT component while awaiting receipt of the radio frequency broadcast. Without the WT component, the LPRF communications component would not power down to the off state between time periods of actively receiving and transmitting but, instead, only would power down to standby mode and, thus, the WRT overall would draw on the order of approximately 10 mA of current. Consequently, by providing the WT component as part of the WRT, the LPRF communications component may power down to the off state such that the current requirement of the WRT is reduced three orders of magnitude, i.e., from milliamps to microamps.

This significant reduction in power consumption while awaiting receipt of a targeted radio frequency broadcast practically removes the limitation on the WRT's useful life that otherwise arises from its power consumption, thus providing tremendous advantage in increasing the useful life of the WRT. Indeed, whereas the energy source incorporated into a WRT is anticipated to last for about 90 days or less before becoming depleted of charge, it is anticipated that the same energy source incorporated into a WRT of the present invention, which includes the WT component, would never be depleted of charge during standard operations of the WRT. Rather, it is anticipated that the energy source itself first would fail before becoming depleted from standard WRT operations. The WRT of the present invention is expected to last years—not days—and is expected to exceed the useful life of the energy source itself, which now presents the new limiting factor in determining a WRT's useful life.

WRTs of the present invention preferably are utilized in sensor information collecting and/or asset-tracking applications, and methods for forming *ad hoc* networks by these WRTs will now be described in detail. In either context, the radio frequency utilized by the WRTs preferably is 2.4 GHz, for which no license is required in any country. Furthermore, in the asset-tracking context utilizing the WRTs preferably read wireless tags that, themselves, are associated with the assets to be tracked. In other alternative embodiments, however, the WRTs also serve the wireless tag function, with each WRT being associated with an asset to be tracked. In these embodiments, a reader component of the WRT may be omitted if no wireless tag is to be read by the WRT.

Class-Based Network Formation

In further accordance with the present invention, each of the Wireless Reader Tags also includes a class-based network formation (CBNF) routine that enables the Wireless Reader Tags to coordinate with one another in collectively forming hierarchical *ad hoc* networks, each network being defined by Wireless Reader Tags of a common WRT Class (hereinafter "Class-Based Network"). The CBNF routine is executed upon startup of the Wireless Reader Tag, on specific command broadcast to the Wireless Reader Tag, or as otherwise needed (such as to maintain an *ad hoc* network). The CBNF routine is implemented in software operable on the digital processor of each Wireless Reader Tag in the preferred embodiments. Alternatively, the CBNF routine is implemented in other ways, such as hardwired logic circuitry in each of the Wireless Reader Tags. As described in detail below, each Class-Based Network is a hierarchical network that provides an efficient topology for selective communication among Wireless Reader Tags of the same WRT Class.

WRT Broadcasts are made by a network interface module (hereinafter "Gateway") that serves as a communication link between the *ad hoc* hierarchical networks established by the Wireless Reader Tags and an external network, such as a local area network (LAN), wide area network (WAN), or the Internet. The Gateway includes at least a network interface and an RF interface for communication with Wireless Reader Tags of the *ad hoc* networks. An asset-tracking application server or equivalent computer system is connected with the external network and obtains through the *ad hoc* networks information on the tagged assets for compilation, analysis, and/or display.

Communication between the Gateway and a Wireless Reader Tag of the highest hierarchical level in each Class-Based Network may be established utilizing step-power filtering technique if a number of Class-Based Networks otherwise exceeds the multiple channel communication capabilities of the Gateway. In this respect, the Gateway is enabled to selectively communicate with such Wireless Reader Tags based on physical distance from the Gateway.

Application Server communicates with nodes of *ad hoc* network through the external network and the Gateway to obtain and compile information regarding tagged assets. In this respect, it now will be appreciated by those having ordinary skill in the art that the nodes of these Class-Based Networks comprise a distributed database of information pertaining to the tagged assets. As set forth above, a Wireless Reader Tag or a Wireless Tag stores in memory not only a WRT ID or WT ID, respectively, but also may store additional information such as, for example: class designation; sensor derived information; a priority designation to provide improved response to selected broadcasts; a privilege level; time-sensitive information; a characteristic of the particular tagged asset; and/or a behavior of the tagged asset. This stored information becomes accessible by the asset-tracking application server through the Classed Based Networks. The asset-tracking application server also can obtain the WRT ID associated with each WT ID for intelligence gathering purposes.

Turning now to FIG. 1, a preferred embodiment of the present invention is illustrated in a shipping environment 100 including a warehouse 104. A Wireless Reader Tag 110 (also represented by "LPRF" in the drawings) is attached to each pallet 120 in the shipping environment 100. An actual implementation would involve thousands of pallets and LPRFs; however, for clarity only three pallets 120 and Wireless Reader Tags 110 are shown in FIG. 1. Assets 134 on the pallets 120 each are tagged with a Wireless Tag 130 (also represented by "RFT" in the drawings).

Each Wireless Reader Tag 110 preferably is active, while each Wireless Tag 130 preferably is semi-passive. As set forth above, passive Wireless Tags 110 and Wireless Reader Tags 130 are devices that collect RF energy inductively and selectively respond, including sending information that is stored thereon. These type of devices may be viewed as selective reflectors of incident RF signals. Semi-passive and semi-active Wireless Tags 110 and Wireless Reader Tags 130 are devices that use internal energy, in the form of a battery, to power some portion of the circuit to either detect a transmission or make a transmission. Active Wireless Tags 110 and Wireless Reader Tags 130 are devices that use internal power, in the form of a battery, to both detect and make transmissions.

Preferably, both Wireless Tags 130 and Wireless Reader Tag 110 are read-write devices, but the Wireless Tags 130 may be read-only (generally characteristic of passive devices) within the scope of the present invention.

A Gateway 140 (also represented by "NIM" in the drawings) represents a communication link between an external network (LAN) 150 and Class-Based Networks formed by the Wireless Reader Tags 110. The Gateway 140 is an external network access transceiver that comprises a radio base station directly or indirectly connected to a wired network (e.g., using Ethernet, or wireless Ethernet). The radio base station portion of Gateway 140 is an LPRF-compatible module that communicates with Wireless Reader Tags 110 of the Class-Based Networks. In essence, the Gateway 140 links the Class-Based Network of the present invention with conventional network topologies that use conventional network protocols. The Gateway 140 thereby facilitates monitoring, controlling, and querying Wireless Reader Tags 110 and Wireless Tags 130 in the Class-Based Networks using application software running on a server computer 160 connected to the external network 150. The server 160 may be operated on a general purpose computer, such as a personal computer, minicomputer, or mainframe.

A system in accordance with the present invention may include components in addition to those described above. For example, a Communicator 170 (also represented by "HIM" in the drawings) and a mobile locating Gateway 180 (also represented by "MLG" in the drawings) are provided in the preferred embodiment of FIG. 1. Communicator 170 is used to manually read class designations from network entities, such as Wireless Reader Tag 110 and Wireless Tags 130, and to assign class designations. Gateway 180, which is installed in shipping vehicle 184, has the core capabilities of a Wireless Reader Tag and a Gateway, plus at least two additional features. Gateway 180 includes a GPS receiver (not depicted) for determining geographic location of shipping vehicle 184 and a mobile interface such as a cellular or satellite transmitter 186 for transmitting data to server computer 160 via a mobile phone network 188. In implementation, the Communicator 170 and Gateway 140,180 each include a Wireless Reader Tag incorporated therein. Thus, because Gateway 140,180 and Communicator 170 each includes the core hardware and software of a Wireless Reader Tag, each can actively pparticipate in the formation, control, and maintenance of the Class-Based Networks.

The operation of the CBNF routine of multiple Wireless Reader Tags in accordance with the present invention for forming Class-Based Networks now is described.

Network Formation

In accordance with the present invention, the CBNF routines of multiple Wireless Reader Tags cooperate to propagate a distinct hierarchical network among each of multiple WRT Classes of the Wireless Reader Tags. To accomplish this class-based network formation, the WRT Class for each Wireless Reader Tag is stored in memory and included in the preamble of each network formation communication generated by the Wireless Reader Tag. The WRT Class may be identified by any series of codes or characters, the interpretation of which should be standardized and used by all possible recipients of network formation communications (including all Wireless Reader Tags 110, Gateways 140,180, and Communicator 170).

For example, a WRT Class may include a category/subcategory list such as "/Wal-Mart/Shipment_123", or a linked list representing relationships of various categories and subcategories defined in a profile of the Wireless Reader Tag. Moreover, in this example, the WT Classes of Wireless Tags associated with a Wireless Reader Tag of the WRT Class "/Wal-Mart/Store_290/Shipment_123" could include "/Televisions/32in" and "/Televisions/27in", representing 32 inch televisions and televisions 27 inch televisions on a pallet (to which the Wireless Reader Tag is attached) that is scheduled for inclusion with shipment number 123 to Wal-Mart store number 290.

Alternatively, if Wireless Reader Tags 110 are not pre-programmed in non-volatile read/write memory with a WRT Class designation, a Wireless Reader Tag 110 may acquire a class designation by reading Wireless Reader Tags 110 or Wireless Tags 130 nearest to it, and then store the class designation and other profile information in non-volatile read/write memory. Specifically, a WRT can acquire or "adopt" a class designation from a surrounding WRT or WT when that function is provided for in the "profile" of the WRT. As used herein, a "profile" of a WRT includes a list of attributes that invoke operating system functions, and can include information such as "adopted class." If, for example, a WRT that is in a manufacturing area moves past a physical boundary that puts it within a shipping area, then the WRT automatically adopts a shipping class for its previous manufacturing class. The class designations may look like this:

When in Manufacturing:/Sony/TV/24"/Manufacturing-Finishing/Serial #10

When in Shipping:/Sony/TV/24"/Shipping/Serial #10

The value to this system is that as products are completed, the class on a pallet will not need to be manually changed because it automatically updates according to location (i.e., near the shipping docks). The same may happen once a driver leaves the parking lot and the radios no longer communicate to a NIM, but now communicate with a MLG. In this case, the class designations may look like this:

/Sony/TV/24"/Intransit/ABC Trucking/Serial #10

Thus, when a pallet 120 is moved onto shipping vehicle 184, the pallet's Wireless Reader Tag 110 migrates to join a Class-Based Network headed by Gateway 180. Gateway 180 then is able to report the migration to application server 160 via a network link that it has formed with Gateway 140.

The WRT Class may also include other information concerning a status, characteristic, or privilege of the Wireless Reader Tag, the network, or other conditions. Virtually any profile information can be included in the preamble and combined with class designation information to be used for network formation. Furthermore, the preamble information can be represented in any convenient format, including various encoding schemes. In one embodiment, a Walsh code is assigned to each class definition and provided to Wireless Reader Tags of the class.

Walsh codes are well understood in the field of digital wireless communications and, therefore, require only a brief explanation here. Walsh codes are used to encode data packets and to designate the class of Wireless Reader Tags that are enabled to receive and decode a particular packet of data. The association of Walsh codes with class designation information facilitates reduced battery consumption in Wireless Reader Tags by utilizing targeting methods requiring very little processing power. The use of Walsh codes also improves data security by encoding of such communications. Those skilled in the art will recognize that many other methods may be used for encoding class designation information in the preamble of data packets to facilitate class-based network formation and network formation communications while reducing battery consumption and RF interference.

Figure 2:
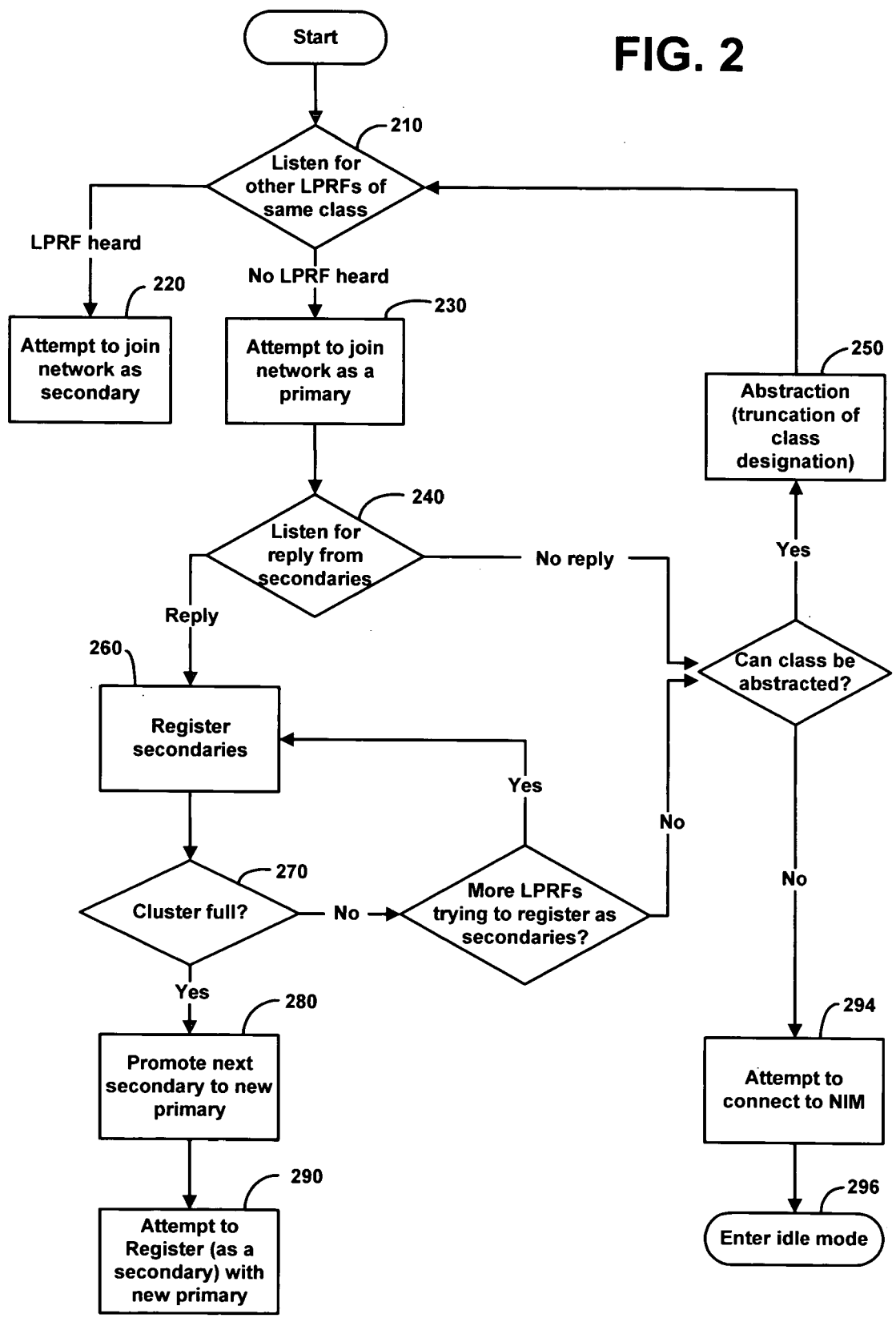
FIG. 2 is a flowchart illustrating a preferred operation of the CBNF routine operating on Wireless Reader Tags in accordance with the present invention.

FIG. 2 is a flowchart illustrating a preferred operation of the CBNF routine in accordance with the present invention to form a Class-Based Network. With reference to FIG. 2, upon power up, a first Wireless Reader Tag of a predetermined WRT Class initially listens (Step 210) for transmissions of other Wireless Reader Tags of the same WRT Class, which would indicate the presence of a Class-Based Network for such WRT Class. If such a Class-Based Network is detected, then the first Wireless Reader Tag attempts to join (Step 220) the Class-Based Network as a "secondary" unit by issuing a registration request signal. Otherwise, if no Class-Based Network is detected, then the first Wireless Reader Tag attempts join the overall network by establishing such a Class-Based Network as a "primary" unit. This is done by transmitting (Step 230) a "primary_ready" signal to all other Wireless Reader Tags of the same WRT Class within the broadcast range of the first Wireless Reader Tag. The first Wireless Reader Tag then listens (Step 240) for replies from other Wireless Reader Tags attempting to register as secondary units in the new Class-Based Network.

If no reply for registration as a secondary unit is detected, and if the WRT Class of the first Wireless Reader Tag can be abstracted, then the WRT Class is abstracted (Step 250) by truncating the class designation. For example, if the initial WRT Class is "/Wal-Mart/Store_290/Shipment_123", then the class designation is abstracted to "/Wal-Mart/Store_290". The process then repeats starting at Step 210 for this abstracted class designation as the new WRT Class for the first Wireless Reader Tag. If this process continues to repeat, the class designation will not be able to be abstracted further without otherwise being generic to all classes of Wireless Reader Tags, i.e., WRT Class being "/". At this point, the first Wireless Reader Tag attempts to connect (Step 294) to a Gateway ("NIM" in FIG. 2) and register as a member of the WRT Class that is the highest abstraction possible without being generic to all Wireless Reader Tags (i.e., as a member of the root class "/Wal-Mart"). Upon successful registration with the Gateway, the first Wireless Reader Tag then enters (Step 296) sleep—or standby—mode to conserve battery power.

If a reply from a secondary unit is detected, then the first Wireless Reader Tag registers (Step 260) the secondary unit and repeats the registration for each reply from other secondary units until a determination is made (Step 270) or until no more such replies are detected. A "cluster" in this context comprises a primary unit and the secondary units with which the primary communicates directly, and may be limited in number of units by the number of communication channels that can be supported by the primary unit operating as a cluster head. Once a cluster is full, the first unit (cluster head) responds to the next secondary unit attempting to register by promoting (Step 280) it to the status of a primary unit. The first Wireless Reader Tag—now the cluster head of the full cluster—then attempts to register (Step 290) with the newly promoted primary unit as one of its secondary units. The new primary unit, in turn, then is available to serve as a cluster head for other Wireless Reader Tags, to promote other Wireless Reader Tags to higher level primary units, and so forth, thereby propagating a hierarchical Class-Based Network from the "bottom-up." The first Wireless Reader Tag and the other Wireless Reader Tags form the Class-Based Network using the same CBNF routine.

Returning to Step 270, if the cluster of the first Wireless Reader Tag does not completely fill, if no more first Wireless Reader Tags attempt to register as secondary units, and if the first Wireless Reader Tag has a class designation that is other than its root class, then the first Wireless Reader Tags abstracts its WRT Class (Step 250) by truncating the class designation and starts over the entire CBNF routine beginning at Step 210 (i.e., listening for the presence of Wireless Reader Tags of the truncated class at Step 210, etc.). Note that in accordance with preferred embodiments of the present invention, a Wireless Tag or Wireless Reader Tag will respond if its class is identified in a communication, even if the class in the communication is abstracted. Thus, a Wireless Tag or a Wireless Reader Tag having a class designation of "/sony/tv/color/24" will respond to a communication identifying the class as "/sony/tv" as its class (i.e., its abstracted class) is identified in the communication.

If no other Wireless Reader Tags are attempting to register and if the first Wireless Reader Tag's WRT Class cannot be abstracted, then the first Wireless Reader Tag attempts to register (Step 294) with the Gateway and, thereafter, enters (Step 296) into an idle mode. Alternatively, the first Wireless Reader Tag may start attempting to register with the Gateway soon after it becomes a primary at Step 230 or concurrently with filling its cluster at Step 270. Furthermore, when promoting a Wireless Reader Tag to a primary unit, the first Wireless Reader Tag would also pass to the promoted Wireless Reader Tag the responsibility for connecting with the Gateway on behalf of the cluster, if possible.

In accordance with the Bluetooth standard, the Gateway will be able to communicate with seven other WRTs simultaneously. However, the targeted WRT Class can revolve on each channel as a function of time in order to address multiple WRT Classes on the single channel. Upon registration with the Gateway, the system may establish a revolving communication schedule with revolving class addressing that allows the Gateway to communicate with hundreds or thousands of WRT Classes on the channel. Synchronization between the Gateway and Wireless Reader Tags is important for proper operation of revolving class addressing and to minimize battery consumption. Accordingly, as WRT Classes are added to the overall network and establish communication with a Gateway, the Gateway may synchronize, reconfigure, and optimize the WRT Class' schedule for revolving class addressing.

The Class-Based Networks also are reconfigurable in response to changes in the location, status, behavior, characteristics or class designation associated with the Wireless Reader Tags. For example, assets of a class (e.g., in-production) can be selectively transferred to a new class (e.g., shipping) by merely changing the WRT Class designation with which the assets are associated. Class-Based Networks also facilitate the use of asset-tracking applications and process flow controls to track and manage the assets based on real-world requirements, such as manufacturing requirements, shipment, warehouse management, zone control, environmental impacts, etc. Class-Based Networks also facilitate automated segregation and delivery of assets.

In a "top-down" CBNF routine, illustrated in FIGS. 12–21, when a cluster is filled the secondary units that have already registered with the first Wireless Reader Tag (the cluster head) may be promoted to assume the role of middle-hierarchy primary units, called "sub-primaries." Sub-primaries, which continue as secondary units below the first Wireless Reader Tag (cluster head), then provide connectivity for any additional Wireless Reader Tags that are attempting to join the Class-Based Network in clusters headed by the sub-primaries.

In both the top-down and bottom-up methods, secondary units promoted by the first Wireless Reader Tag become new cluster heads that, themselves, may provide connectivity to Wireless Reader Tags of the same WRT Class that are beyond the actual transmission range of the first Wireless Reader Tag. The Wireless Reader Tags thereby collectively form a hierarchical, multi-tiered network based on class designation that propagates both in quantity of nodes and geographic coverage. Tightly grouped Class-Based Networks formed in accordance with the present invention thus make it possible to communicate to and among a particular target class of Wireless Reader Tags without requiring messages to be received, processed, or routed by Wireless Reader Tags that are not members of the target WRT Class or an abstracted Class thereof. This hierarchical Class-Based Networks is an efficient topology for communicating among Wireless Reader Tags of the same WRT Class, because it reduces the number of network nodes through which messages must pass and, consequently, thereby significantly reduces RF interference and battery power consumption otherwise experienced.

FIGS. 3–11 depict Wireless Reader Tags in a time-sequence of events showing a bottom-up method of the CBNF routine. With reference to FIGS. 3–11, Wireless Reader Tags 1–6 and Wireless Reader Tags A–G are members of WRT Classes "circle" and "triangle," respectively, which are arbitrary class designations assigned for purposes of illustration only. In this example, the Wireless Reader Tags 1–6 and Wireless Reader Tags A–G operate on up to three communication channels and one general channel (also called the control channel). The Wireless Reader Tags all include CBNF routines operating in accordance with the method shown in FIG. 2.

The CBNF routine of each Wireless Reader Tags 1–6 and Wireless Reader Tags A–G is configured to initially listen for a communication having a data packet with a preamble that identifies a Wireless Reader Tag of the same WRT Class as the Wireless Reader Tag executing the CBNF routine (see FIG. 2, Step 210). In this example, the preamble of each packet is represented by a colon-separated string of information, as follows:

: Target Class: My Profile: Action Requested: Target Cluster Head ID where "Target Class" is the WRT Class of Wireless Reader Tags directed to wake up from standby to receive and process the data packet. In this example, the Target Class is either "/circle" or "/triangle" (there are no subcategories in this example). However, in a more complex embodiment (not shown) the Target Class designation could include subcategory information in a slash-separated list, in a linked list, with Walsh codes, or by any other method of representing category and subcategory information. The "My Profile" section of the preamble identifies the Wireless Reader Tag transmitting the communication by WRT Class and WRT ID unique to the Wireless Reader Tag. The "Action Requested" includes the message, and the "Target Cluster Head ID" identifies the Wireless Reader Tag of the cluster head or proposed cluster head, if any.

Figure 3:
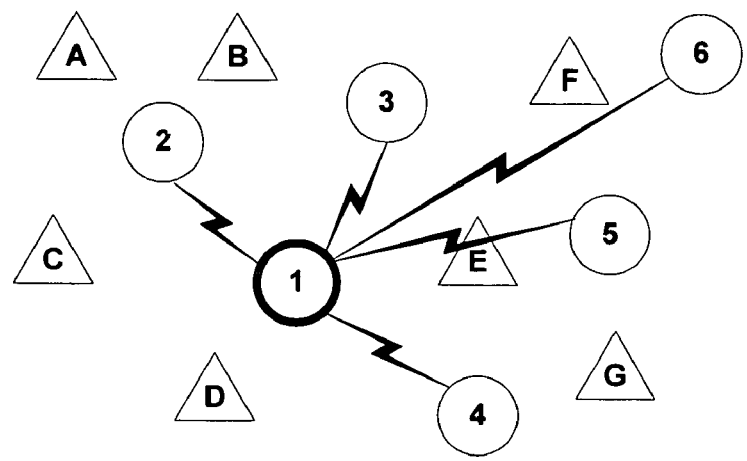

Thus, for example, with reference to FIG. 3, after listening for data packets of its WRT Class (i.e., /circle) and detecting none, Wireless Reader Tag 1 attempts to start a Class-Based Network for the WRT Class of "/circle" as a primary unit by transmitting a data packet having the following preamble:

:/circle:/circle/unit1: primary_ready: no_primary

The class designation "/circle" causes only Wireless Reader Tags of the WRT Class "/circle" to receive and process the message of the data packet. Wireless Reader Tag 1, if it receives no replies, may retransmit the communication multiple times before timing out and beginning a beacon procedure or entering a battery-saving lost mode. Furthermore, the data packets (and others described below) may encapsulate a data payload or may have a null payload.

Wireless Reader Tags are preferably synchronized to allow scheduled communication to a particular WRT Class at regular intervals. When an Wireless Reader Tag communicates to a target WRT Class, the Wireless Reader Tag transmits a data packet at a time precisely synchronized with the targeted WRT Class. To conserve battery power, the receiving members of the WRT Class only power up to listen at each such interval and only for very small periods of time (e.g., a few milliseconds) when data packet for such WRT Class would normally be transmitted. The intervals at which a Wireless Reader Tag listens for communications directed to its WRT Class is called the duty cycle, which can be dynamically adjusted to respond to network communication demands while minimizing battery consumption. Depending upon the time sensitive nature of the assets being tracked and their priority, a period of inactivity may prompt a Wireless Reader Tag to limit its duty cycle to intervals of minutes or hours. After a prolonged period of inactivity, a Wireless Reader Tag may ping (transmit) to determine whether other Wireless Reader Tags are still alive and available for communication. Assuming that no network changes have occurred, the Wireless Reader Tag goes back to sleep until the next duty cycle. Network changes may cause all or a part of a Class-Based Network to reconfigure.

Figure 4:
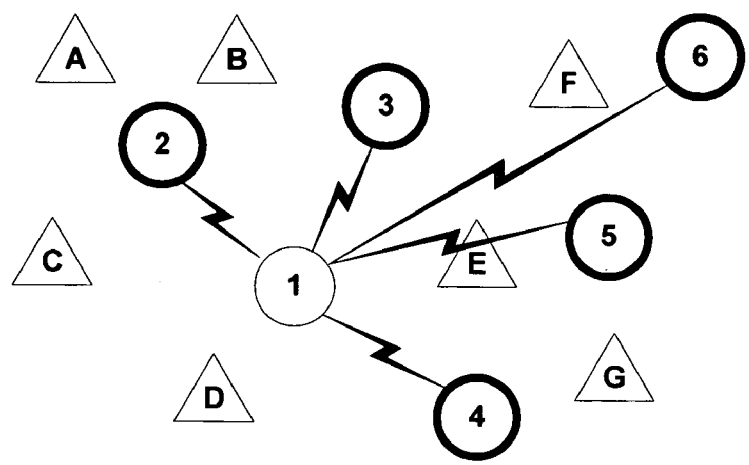

With reference to FIG. 4, in response to the "primary_ready" signal, Wireless Reader Tags of WRT Class "/circle" within range of Wireless Reader Tag 1 respond with a registration request signal, as listed in Table 1 of FIG. 26.

Because the registration request packets include in their preambles a target WRT Class of Wireless Reader Tag 1, only Wireless Reader Tag 1 will wake up from standby to receive and process the registration request packets. The transmitters of Wireless Reader Tags 2–6 would preferably include conventional collision avoidance routines to avoid interfering transmissions of the registration request packets, as set forth by the Bluetooth specifications.

Figure 5:
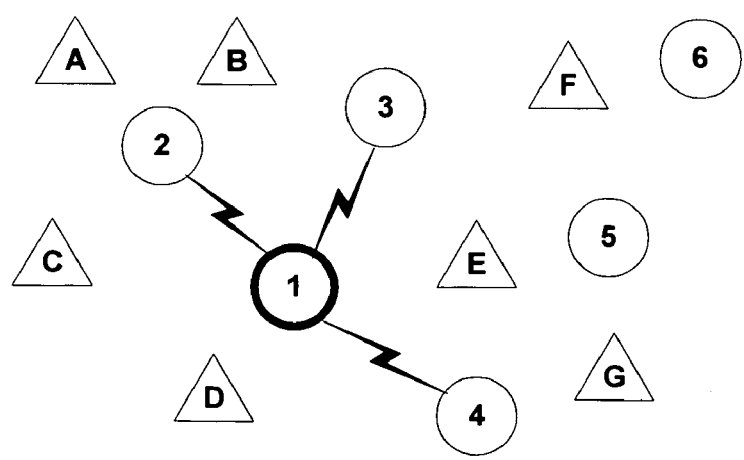

With reference to FIG. 5, in response to receipt at Wireless Reader Tag 1 of the registration_request signals from Wireless Reader Tags 2–6, the CBNF routine of Wireless Reader Tag 1 registers and acknowledges the secondary Wireless Reader Tags to form a cluster. In this example, Wireless Reader Tag 1 has a maximum cluster capacity of three secondary units. Consequently, it only registers and acknowledges the three Wireless Reader Tags from which the strongest registration request signals are received which, in this example, are Wireless Reader Tags 2–4. (Note that the ability of a LPRF device to determine signal strength is conventional and, therefore, is not described in detail herein.) By registering and acknowledging secondary units on the basis of signal strength, rather than on a first-come-first-served basis or some other basis, the CBNF routine establishes a cluster that is energy efficient for communication within the cluster. To acknowledge registration of the secondary units, Wireless Reader Tag 1 transmits an acknowledgement signal to the Wireless Reader Tags 2–4, as set forth in Table 2 of FIG. 27.

The network topology is now shown in FIGS. 6 and the cluster hierarchy is depicted in FIG. 6A. The two concentric circles of Wireless Reader Tag 1 indicate that it is a cluster head at Level 2 in the network hierarchy.

With reference to FIG. 7, with its cluster capacity now exceeded, Wireless Reader Tag 1 (the cluster head) selects from the other Wireless Reader Tags attempting to register the unit having the strongest registration request signal (in this example Wireless Reader Tag 5) and directs such unit to become a new primary unit. The new primary unit then serves as a new cluster head for a cluster in which Wireless Reader Tag 1 becomes a secondary unit (thus the "bottom-up" description of the method). In this example, the command from Wireless Reader Tag 1 to Wireless Reader Tag 5 is:

:/circle/unit5:/circle/unit1: promote_and_request_primary: no_primary

With reference to FIG. 8, Wireless Reader Tag 5 acknowledges the promotion signal from Wireless Reader Tag 1 and begins to propagate the Class-Based Network at the next higher level in the hierarchy, which now has three levels as depicted in FIG. 8A. In acknowledging its promotion and registration as a primary to Wireless Reader Tag 1, Wireless Reader Tag 5 transmits its acknowledgement packet to all units of its class within range, by the following preamble:

:/circle:/circle/unit5: primary_acknowledged:/circle/unit5

By transmitting to all units of its WRT Class within range, Wireless Reader Tag 5 efficiently registers with Wireless Reader Tag 1 and concurrently shares primary status information with all Wireless Reader Tags of its WRT Class within its broadcast range (which is different from the broadcast range of Wireless Reader Tag 1). The three concentric circles around Wireless Reader Tag 5 indicate that it is a primary in the third-level of the hierarchy of the Class-Based Network.

With reference to FIG. 9 and 9A, Wireless Reader Tag 6, upon receiving Wireless Reader Tag 5's registration acknowledgement (FIG. 8), requests to register as a secondary unit to Wireless Reader Tag 5 by sending a packet with the following preamble:

:/circle/unit5:/circle/unit6: request_primary:/circle/unit5

To which, unit 5 responds with:

:/circle/unit6:/circle/unit5: registration_ackn:/circle/unit5

This exchange results in the hierarchy shown in FIG. 9A.

With reference to FIG. 10, a Class-Based Network for the WRT Class "/triangle" is similarly formed by Wireless Reader Tags A–G concurrently with the steps shown in FIGS. 3–9, whereby two distinct hierarchal Class-Based Networks result as shown in FIG. 10A.

With reference to FIG. 11, if a Gateway is available, the highest level primary units (Wireless Reader Tags 5 and A in this example) register with the Gateway to establish connectivity to an external network including an application server (no shown) communicating therewith.

FIGS. 12–21 illustrate another preferred top-down CBNF routine in which the Wireless Reader Tags transmit a series of network formation communications in the course of self-organizing a hierarchical network, the topology of which is shown at various stages adjacent to FIGS. 13, 16, 19, and 21 in respective FIGS. 13A, 16A, 19A, and 21A. As with FIGS. 3–11, the transmitting Wireless Reader Tags are shown in heavy bold outline, but the hierarchical levels are not indicated this time by inner circles and triangles.

With reference to FIG. 12, a first Wireless Reader Tag 1 wakes up and reads profile information stored in its memory, including a predefined class designation of "/circle" as its WRT Class. This profile is stored into the memory of the Wireless Reader Tag 1 during an initialization of the Wireless Reader Tag 1. Based on this class designation, Wireless Reader Tag 1 then listens for transmission activity by other Wireless Reader Tags of the same WRT Class. If the nearby Wireless Reader Tags of the WRT Class have already formed a Class-Based Network for "/circle" accordance with the present invention, then Wireless Reader Tag 1 attempts to join such Class-Based Network. Otherwise, Wireless Reader Tag 1 attempts to organize a Class-Based Network for such WRT Class.

To begin organizing Class-Based Network, Wireless Reader Tag 1 transmits a primary_ready signal including its designated WRT Class. As in the CBNF routine described above in FIGS. 3–11A, the primary_ready signal is preferably a data packet that includes in its preamble data representative of the "circle" class designation. In FIG. 12, the bold boundary of Wireless Reader Tag 1 indicates that it transmits rather than receives. The range of the transmission is depicted by dashed circle "R." Nearby Wireless Reader Tags 2–5 and B, C, D, and E, which are within range of the primary_ready signal, each processes only the preamble portion of the primary_ready signal to determine whether the transmission if from a Wireless Reader Tag of the same WRT Class. By first processing only the preamble portion of the primary_ready signal, battery power is conserved in triangle Wireless Reader Tags B, C, D, and E. If it is of the same class, then the receiving Wireless Reader Tag—in this example, each of Wireless Reader Tags 2–5—wakes up, receives, and processes the entire primary_ready signal, and then responds as shown in FIG. 13 and described below.

With reference to FIG. 13, each of the Wireless Reader Tags of the WRT Class "/circle" that received the primary_ready signal in FIG. 12 (i.e., units 2–5) responds to the primary_ready signal with a registration_request signal. Upon receipt of the registration_request signal, Wireless Reader Tag 1 assumes the status of a primary unit, while Wireless Reader Tags 2–5 assume the status of secondary units. FIG. 13A shows the resulting 2-tiered network hierarchy tree representative of the Class-Based Network thus formed between Wireless Reader Tags 1–5.

Next, with reference to FIG. 14, a third tier of the hierarchical network is formed by Wireless Reader Tag 6. In this regard, Wireless Reader Tag 6 was out of range of Wireless Reader Tag 1's primary_ready signal shown in FIG. 12, but is within range of the registration_request of Wireless Reader Tags 3 and 5 shown in FIG. 13. Wireless Reader Tag 6, which was listening during the step shown in FIG. 13, received the registration_request signals of Wireless Reader Tags 3 and 5 because those signals included the "/circle" class designation matching the "/circle" class designation of Wireless Reader Tag 6. The registration request signals indicate to Wireless Reader Tag 6 the presence of a nearby Class-Based Network of corresponding WRT Class, which causes Wireless Reader Tag 6 to transmit a request to join this Class-Based Network.

Concurrently with the ongoing formation of the "/circle" class network, FIG. 14 also depicts the beginning stages of the formation of a Class-Based Network for the WRT Class of "/triangle" by Wireless Reader Tags A–G. In this regard, Triangle Wireless Reader Tag A wakes up and listens for the presence of a "/triangle" class network. Detecting no other "/triangle" WRT Class signals, Wireless Reader Tag A transmits a primary_ready signal, similar to the transmission of Wireless Reader Tag 1 shown in FIG. 1, but with a "/triangle" class designation forming part of the preamble of the primary_ready signal.

With reference to FIG. 15, triangle class Wireless Reader Tags B, C, and D receive the primary_ready signal of Wireless Reader Tag A and respond with registration_request signals, thereby forming a second hierarchal Class-Based Network, as shown in FIG. 16A.

Also shown in FIG. 15, circle Wireless Reader Tags 3 and 5 respond to the request to join of Wireless Reader Tag 6 of FIG. 14 with primary_ready signals. Wireless Reader Tag 6 then responds to the strongest primary_ready signal received (in this example, the signal from Wireless Reader Tag 5), with a registration_request. Wireless Reader Tag 6 thereby forms a third tier of the Class-Based Network for "/circle" WRT Class, also as shown in FIG. 16A.

With reference to FIGS. 17–19, Wireless Reader Tags E, F, and G of the WRT Class "/triangle" each joins the Class-Based Network for triangles formed by Wireless Reader Tags A, B, C, and D.

Figures 21, 21A:
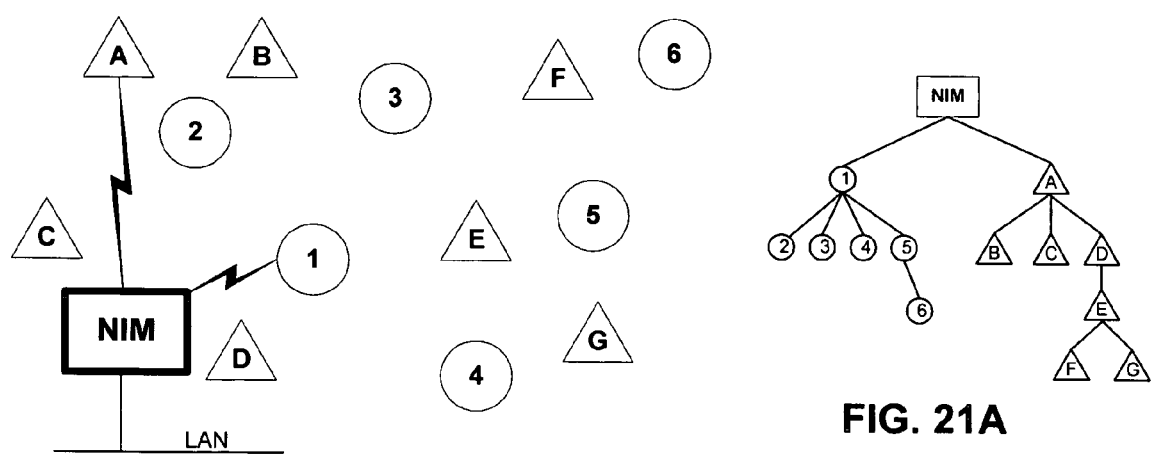

FIGS. 20–21A illustrate the completion of the Class-Based Networks with the registration with the Gateway of the highest primary unit in each Class-Based Network hierarchy.

As will now be apparent to one having ordinary skill in the art, in conjunction with the asset-tracking application server, Class-Based Networks facilitate automated and semi-automated segregation, tracking, monitoring, and delivery of assets. The server issues, via the Gateway, class-directed messages to monitor and track WRT Classes. User-defined class granularity facilitates the use of separate categories and/or subcategories for various attributes and states of the assets, e.g., production batches, phases of production, and the delivery process. By increasing granularity, i.e., using many categories or subcategories (including sub-subcategories and so on), messages or other class-directed communications from the application server can be directed to only those classes of interest representing such categories, subcategories, or sub-subcategories, as desired. Furthermore, because messages or other class-directed communications are transmitted in packets that specify class designations for intended transceiver recipients, only those transceivers that are members of the specified class awaken from standby mode to receive and process the packets, and then to acknowledge or reply thereto as appropriate. Accordingly, this reduces RF interference and power consumption otherwise experienced, while making asset-tracking functions more efficient.

Once established, the Class-Based Networks provide functionality as a dynamic distributed hierarchical database system. In this regard, Wireless Reader Tags and Wireless Tags preferably include a handling routine in communication with a memory of the Wireless Reader Tags and Wireless Tags. The handling routine interprets and responds to class-directed database commands, e.g., data queries or data updates from an asset-tracking application or a Communicator. Database queries may include status queries that provide the asset-tracking application with real-time up-to-date status information about tagged assets. Data updates may include requests to change data maintained on specified Wireless Reader Tags of the distributed database system. Similar to network formation communications, class-directed database commands include preambles that identify a WRT Class of Wireless Reader Tags to which they are directed. In this manner, only those Wireless Reader Tags of the selected class need process the database command. Class-directed database commands may also include, in their preambles, a wildcard that indicates to query handling routines that all Wireless Reader Tags of a particular abstracted WRT Class should receive and process the database commands. Class-directed commands thereby avoid unnecessary radio interference and reduce power consumption by Wireless Reader Tags that are clearly outside the scope of the database search criteria. Database performance is also enhanced by selecting Wireless Reader Tag classes and class abstractions in a way that mirrors a preferred hierarchical structure for the data they contain. In this way, increased class granularity facilitates improved data retrieval efficiency in the distributed database system by reducing the number of Wireless Reader Tags that must be involved in a database query or update transaction. The Class-Based Networks themselves act as a hierarchical database facilitating fast and efficient database queries.

The CBNF routine used to form the Class-Based Networks in accordance with the present invention may also be used to perform autonomous modification and reconfiguration of such networks in response to changes in the location, status, behavior, characteristics or class designation of Wireless Reader Tags and/or Wireless Tags. Similarly, the self-configuration methods of the present invention facilitate maintenance of radio communication links in response to changes in the operational characteristics of the Wireless Reader Tags and/or Wireless Tags that comprise the network fabric. For example, self-configuration routines are responsive to changes caused by battery drain, radio transmitter failures, radio interference, and digital processor failure, by their inherent methods of organizing the network to have optimal link integrity and node connectivity.

Functions/Commands

The following functions preferably are supported in an Wireless Reader Tag of the present invention—and in a Wireless Tag, where indicated—to accomplish the aforementioned class-based network formation and subsequent reformation. The name of the function is followed by the description of the function in the context of the type of transceiver in which it is to be implemented, i.e., Wireless Reader Tag and/or Wireless Tag.

Acquire Class or Sub-Class Structures

Software on the Wireless Reader Tags and Wireless Tags interprets category and subcategory structures represented by WRT and WT Classes, respectively. To initialize, the Wireless Reader Tags arbitrarily form networks based on the ability to talk to other Wireless Reader Tags. When a Wireless Reader Tags wakes up it broadcasts a message to other Wireless Reader Tags that it is a primary unit seeking secondary units. Other Wireless Reader Tags awaken to receive the message and attempt to register with the primary unit. If they are unable to communicate with the primary unit, or if the primary unit's cluster is full, then the secondary units will attempt to become a primary unit and continue the process. Once Wireless Reader Tags have established a network, the highest primary unit of the hierarchy contacts the Gateway and communicates with the application server, whereupon a profile is downloaded to the primary unit and passed on to each Wireless Reader Tag of the network. The profile downloaded is based on options such as reading Wireless Tags, WRT IDs, business rules located at the application server and other information that has been downloaded by a Communicator. For example, and with regard to a WRT, the profile is a list of attributes or "personalities" assigned to each WRT. The list in the profile will be determined by business rules (like "things move into the shipping are ready to be shipped", "all fresh meat shipments must leave the plant within 24 hours of packing", etc.); a Communicator (used, for example, by a supervisor who views the asset and determines that it needs another coat of painting and manually changes the class back to "pre-paint step", etc.); and server application (first two-hundred assets shipped to New Jersey, next two-hundred assts shipped to Florida, last five-hundred assets shipped to California, etc.). The profile function can allow conditional class change.

Once the Wireless Reader Tags have their respective profiles, the Wireless Reader Tags reform in Class-Based Networks based on rules defined by the software located on the Wireless Reader Tags. If read-only Wireless Tags are used, then the WR Class can be pre-programmed into the Wireless Tags but will not be able to be modified dynamically. The dynamic acquisition of a WRT Class is based on rules defined by the application server.

Allow Class/State Change

Class changes are allowed based on business rules setup by the customer to track and group their assets. The rules are built into the server application and the software on the Wireless Reader Tags. The profile provides information that allows dynamic decisions to be made by the Wireless Reader Tags. Once the Wireless Reader Tags have determined that their category, subcategory, etc. as represented by their WRT Class has changed, the Wireless Reader Tags must join the new WRT Class. The ability to allow such a class change provides functionality to allow dynamic changes to WRT Class by a Wireless Reader Tag. For example, with reference to FIGS. 10 and 10A, changing the WRT Class of the Wireless Reader Tag E to "/circle" from "/triangle" causes Wireless Reader Tag E it to join the Class-Based Network for the circle, either as a secondary unit in a cluster of an existing primary unit (e.g., circle Wireless Reader Tag 5), or by becoming a primary unit itself. Continued contact between Wireless Reader Tag E and the WRT Class of triangles could be limited based on system rules, but preferably is terminated. In an example of this, the WRT class of triangles could represent goods in the process of being manufactured in a factory. When these goods enter a shipping section of the factory, the Wireless Reader Tags associated with the goods on the pallet would automatically acquire a "shipping" WRT Class representative of their current location and associated status in shipping.

Form Class

A Class-Based Network for a new class can be established by downloading a new profile and using the command "Determine Primary". The command then uses techniques in FIGS. 2–21 to establish the Class-Based Network for the new class. Profiles and software on the Wireless Reader Tags form the basis for decisions on network formation. The profile must be preprogrammed in the Wireless Reader Tags or Wireless Tags or downloaded from the application server.

Combine Classes

The combination of classes is required when the user no longer wishes to differentiate between two originally defined classes. The profile is downloaded either as a new class profile that has a new class name or downloads to the class to be replaced by the other existing class. After combining classes, the Wireless Reader Tags may reform the network using the CBNF routines of the present invention.

Determine Primary

When a Wireless Reader Tag "wakes up", it determines whether it is able to become a primary unit with the determine primary command. If the health of the device is sufficient, it sends out a message to other Wireless Reader Tags of its WRT Class for registration of secondary units.

Ping MLG/Gateway/Communicator

A Wireless Reader Tag incorporated into a MLG, Gateway, or Communicator sends out a special message identifying itself as part of an MLG, Gateway, or Communicator. The purpose of this message is to inform other Wireless Reader Tags in stand-alone mode that the Wireless Reader Tag incorporated into the MLG, Gateway, or communicator has additional capabilities. The identifying message allows the Communicator to query information from the Wireless Reader Tags or Wireless Tags while the message from the Gateway and MLG indicate an ability to communicate to the external network.

Inventory WT Tags

The Wireless Reader Tag will read all Wireless Tags within range. The profile downloaded from the application server will help the Wireless Reader Tag control misreads and extra tags. Multiple reads of the tags insures high reliability.

Report Communication Links

Upon formation of a Class-Based Network, a Wireless Reader Tag stores identifiers that describe the Wireless Reader Tags constituting neighbors in adjacent levels of the network hierarchy. The primary unit thus will store all the WRT IDs for its secondary units, while the secondary units will store the WRT IDs on the primary unit and any secondary units thereto. The knowledge of communication links, both upstream and downstream, supports responsiveness to queries from the application server.

Report Local Classes

By listening for preambles of data packets intended for other classes, Wireless Reader Tag may store WRT Class information about other Wireless Reader Tags in their vicinity. The Wireless Reader Tags will support queries from the application server to supply this intelligence regarding local class information, regardless of whether the reported class even maintains connectivity to the application server.

Class Structure-Secondary Only

The secondary only command provides entry into a system without giving network formation rights. In this regard, the Wireless Reader Tag with this designation in the profile is allowed to act like the other secondary Wireless Reader Tags, but it is unable to take on the role of a primary unit and, thus, is itself restricted from further propagating the network. This allows the Wireless Reader Tag the ability to move from one WRT Class to another WRT Class without otherwise disturbing the hierarchy of each Class-Based Network of which it becomes a part. A practical of this command enables a customer, who walks into a warehouse retailer, to read product names, costs, or locations in the store without interrupting or disturbing the resident asset-tracking application.

Server Assisted Network Formation

The CBNF routines described above with reference to FIGS. 3–11 and 12–21 involved peer-centric network formation, in which Wireless Reader Tags self-formed an ad hoc Class-Based Network and then contacted an application server via a Gateway. In this peer-centric method, each Wireless Reader Tag contains software that is preprogrammed to interpret class information contained in the preamble of messages being transmitted by other Wireless Reader Tags and then negotiate to be a primary unit. The Wireless Reader Tags use commands such as inventory Wireless Tags, determine primary, and others (described above) to make decisions on class and other profile information that has been preprogrammed in the Wireless Reader Tags. Once the Wireless Reader Tags have formed the Class-Based Network, information is transmitted by the Wireless Reader Tags for connectivity to server applications.

Other network propagation methods within the scope of the present invention are contemplated, and include a server-initiated method and a client/server shared method. In the server-initiated method, the Wireless Reader Tags are attached to pallets or areas to read information from Wireless Tags. The Wireless Reader Tags are turned on and first form an arbitrary network using commands such as Determine Primary. This arbitrary formation is done so that the server can address particular Wireless Reader Tags, and the formation is not based on class designations. The Wireless Tags are read by the Wireless Reader Tags and profiles are downloaded to the Wireless Tags from the Wireless Reader Tags based on commands such as "Inventory RF Tags", described above. Profiles defining a new class structure are then downloaded from the server to the Wireless Reader Tags (and any read/write Wireless Tags) based on business rules. The Wireless Reader Tags are then instructed to Determine Primary again, whereby Class-Based Networks are formed according to the newly-assigned class structure. In this regard, the profiles are lists of options that the Wireless Reader Tag can use to make decisions. For example, if a pallet has TVs on it and the profile lists possible products as VCRs, TVs, Cameras and Unknown, then the Wireless Reader Tag knows to adopt the class of TVs and form a network accordingly. If TV was not in the list, then the Wireless Reader Tag could adopt the class Unknown and generate a system flag for further analysis.

In the client/server shared method, the Wireless Reader Tags are loaded with software preprogrammed to interpret profile information. The profile information may include WT IDs, states, and the like. The Wireless Reader Tags then are reset and boot up looking to read the saved profile, to form hierarchical networks based on class designations specified in the profile, and to look for primary/secondary configurations. Once the Wireless Reader Tags have setup the initial network, network server business rules are downloaded to the Wireless Reader Tags in the form of new profiles to "fine tune" the network. In this regard, general information about how a particular business operates is used to setup the network. Not enough information is known, however, about the assets. In this case, information can be stored in the Wireless Tags as they are attached to the assets, and profiles in the Wireless Reader Tags can enable the Wireless Reader Tags to read this information and make intelligent decisions about how to efficiently setup the network so that the data is an organized within the database in a performance-enhancing fashion.

The following are examples of asset-tracking applications within the scope of the present invention.

EXAMPLE 1

Tagged Luggage System

When a passenger checks in at the airport a Wireless Tag is attached to each item of the passenger's luggage. A corresponding Wireless Tag identifying the passenger is provided to the passenger to verify his/her identity at the destination baggage pickup location. A Wireless Reader Tag near the check-in counter detects and logs the Wireless Tags for the luggage in association with the passenger's Wireless Tag and related information into the asset-tracking system. The asset-tracking system downloads a profile into each of the Wireless Tags as identified by the Wireless Reader Tag at the check-in counter. The profiles are in the format:

: Tag_Type:Airline_Name:Passenger_Class:Origin_and_Destination:Flight_No:Tag$_{13}$ Status:Passenger$_{13}$ id An example of the profile for the passenger's Wireless Tag is:

:passenger:Delta_Airlines:First_Class:ATL-SEA:FLT-490:check-in: 45567788KDKO8 while an example of the profile for the luggage Wireless Tag is:

: baggage:Delta_Airlines:FirstClass:ATL-SEA:FLT-490:check-in:45567788KDKO8

Upon successful check-in, the luggage is placed on the conveyer belt where it is read by another Wireless Reader Tag. By way of a communication from the Wireless Reader Tag, the profile of each Wireless Tag on the luggage then is modified by altering the Tag_Status field from "check-in" to "luggage-transfer_station_4334," which identifies a location of the Wireless Reader Tag at the conveyor belt. Multiple Wireless Reader Tags are positioned along the conveyer belt system to identify the specific area of location of the luggage as it progresses. Trucks that deliver the luggage to the plane also have Wireless Reader Tags attached to the truck and alter the Tag_Status to "departure_on-transfer-truck-1441". Once the luggage is placed on the plane, yet another Wireless Reader Tag detects and logs the Wireless Tag into the asset-tracking system, whereupon a cross-check is made of the luggage as identified by the WT IDs with the luggage that is supposed to be on the plane. Any luggage that is not supposed to be on the plane is flagged for removal by the asset-tracking system and rerouted to its proper destination. Any luggage that is not accounted for raises an alarm, so that attendants are alerted to its arrival time, its position, or its last known position and an investigation can be made.

Once the plane arrives at its destination, the Wireless Tags of the luggage are detected and logged in by an Wireless Reader Tag and the Tag_Status field of each Wireless Tag is changed to "arrival_on-transfer-truck-6633". At the destination baggage pickup, the Wireless Tags on the luggage are read by a Wireless Reader Tag located near an exit of the baggage area. The Wireless Reader Tag detects and logs the luggage Wireless Tags in association with the Wireless Tag of the passenger claiming the luggage, whereupon the asset-tracking system assures that the passenger claiming the luggage is authorized to do so. A passenger inadvertently selecting the wrong luggage may then be alerted to the error.

EXAMPLE 2

Warehouse/Retail System

A warehouse store such as Costco carries hundreds of brands of products. Nevertheless, all products need to be inventoried on a real-time basis. In accordance with the present invention, a Wireless Reader Tag is attached to each pallet of goods and assigned a class designation that denotes the manufacturer of goods on that pallet (e.g., Pillsbury, Sony, Kellogg's, etc.). Each Wireless Reader Tag may also include in its class designation or profile, information about the goods on the pallet. Each boxes on the pallet carries a Wireless Tag that is read by the Wireless Reader Tag of the pallet. On demand, each Wireless Reader Tag gathers information about the Wireless Tags on its pallet and relays the information back to the asset-tracking application server. At any given time, an employee of the warehouse store can inventory goods of a selected manufacturer by sending a query that will be received only by Wireless Reader Tags of the selected class corresponding to such manufacturer. Messages directed to a selected class will not appreciably affect the battery life of Wireless Reader Tags of other classes, as only Wireless Reader Tags of the selected class will wake up from standby mode to receive the messages and process the query. The manufacturer classes can be divided further into categories and subcategories, thereby further collectively reduce battery consumption and radio interference.

EXAMPLE 3

Shipping Containers Tracking System

Containers full of material shipped via rail or ship can be received and logged into a yard by manufacture based on class information stored on Wireless Reader Tags. The Wireless Reader Tags form a network with other containers from a particular manufacturer and allow quick and efficient tracking of containers. Messages directed to a selected class will not affect the battery life of Wireless Reader Tags of other classes because only Wireless Reader Tags of the selected class will wake up from standby to receive the messages and process the queries. The manufacturer classes can be divided into categories and subcategories, thereby further collectively reduce battery consumption and radio interference.

EXAMPLE 4

Manufacturing and Supply Chain Tracking System

A computer manufacturer may track the status of its supply chain in accordance with the asset-tracking application of the present invention. The classes defined are "raw material," "component stuffing," "monitor assembly," "final assembly," "shipping," "in transit," and "distributor." The manufacture can inventory raw material throughout the process by addressing the raw material class, and can find out where in the manufacturing process the computer has reached by addressing monitor assembly or final assembly classes.

In view of the foregoing detailed description of preferred embodiments of the present invention, it readily will be understood by those persons skilled in the art that the present invention is susceptible of broad utility and application. While various aspects have been described in the context of arborist uses, the aspects may be useful in other contexts as well. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

For example, those skilled in the art now also will recognize that methods of network formation other than the described top-down and bottom-up processes may be used to propagate a Class-Based Network based on a multi-level hierarchy by the Wireless Reader Tags. For example, a middle-outward approach or star configuration may be used to propagate the hierarchical network.

Also, for purposes of describing preferred embodiments of the present invention, it has been assumed herein that each WRT Class has more than one member. Otherwise, the sole member of the WRT Class communicates directly with a Gateway. However, this scenario is contemplated within the scope of the present invention.

Furthermore, while each Wireless Reader Tag has been described as belonging to a particular WRT Class, class membership for each Wireless Reader Tag need not necessarily be exclusive, and a Wireless Reader Tag therefore may belong to more than one WRT Class as desired in any particular application of the present invention. Moreover, while each WRT Class has been described as reading a particular WT Class associated therewith, each Wireless Reader Tag may read Wireless Tags associated with different WRT Classes, as desired in the asset-tracking application.

With regard to the distinction between Wireless Reader Tags and Wireless Tags, it is noted that each Wireless Reader Tag includes the capabilities of each Wireless Tag and, therefore, it is contemplated within the scope of the present invention that each Wireless Tag of the present invention could be replaced with a Wireless Reader Tag.

Furthermore, if a Wireless Tag is passive, which is contemplated within the scope of the present invention, then it is believed that the Wireless Tag currently maintains therein only its unique WT ID. Being passive, no other information is maintained in the Wireless Tag. In this case, an associated Wireless Reader Tag maintains the identification of its WT Class in memory as indexed by the respective WT ID of the passive Wireless Tag. Any other information, if maintained, also is stored in the Wireless Reader Tag and indexed by WT ID, where appropriate. Of course, in this scenario, any broadcast generally is answered by each passive Wireless Tag that is within broadcast range and, hence, such implementation of passive Wireless Tags, while within the scope of the present invention, is not preferred.

Finally, from the foregoing it should be apparent to and understood by the Ordinary Artisan that, as used in the above description and in some of the incorporated references, such as U.S. Pat. No. 6,745,027 B2 and application publication no. US 2005/0093703 A1, a "class-based" network represents a network, nodes of which (and specifically, the data communication devices of the nodes of which) share a common "class" designation, which class designation in such references is representative of an asset class. The asset class, in turn, represents a grouping of assets—whether the same or different—that share something in common, such as an attribute, characteristic, relation, or behavior, and each asset comprises a person or thing that is desired to be tracked or monitored.

For example, with respect to a person, an asset may be an employee, a team member, a law enforcement officer, or a member of the military. With respect to a thing or article, an asset may be, for example, a good, product, package, item, vehicle, warehoused material, baggage, passenger luggage, shipping container, belonging, commodity, effect, resource, or merchandise.

The data communication devices of the class-based networks also are disclosed as being low power radio frequency (LPRF) devices, and each device is disclosed as preferably including a standards based radio such as, for example, a Bluetooth radio. Each data communication device further is disclosed as preferably including memory for storing sensor-acquired data.

As will be further disclosed to and understood by the Ordinary Artisan, a class-based network is a network which nodes comprise data communication devices that share a common designation, and which network is formed based on such common designation. As used herein, a network which nodes comprise data communication devices that share a common designation, and which network is formed based on such common designation, is considered to be a "common designation" network. In a class-based network, the common designation of the network is the class designation, and a class-based network therefore is representative of a common designation network.

A remote sensor interface (RSI) network as used herein and in some of the incorporated references represents a network, nodes of which (and specifically, the data communication devices of the nodes of which) each are disposed in electronic communication with one or more sensors for acquiring data there from. The RSI network may be a class-based network, in which case the nodes also share a common class designation representative of an asset class. For instance, the embodiments of the class-based networks described above, and those described in U.S. Pat. No. 6,745,027 B2 and in application publication no. US 2005/0093703 A1, each comprises an RSI network when the data communication devices of the nodes include sensor-acquired information obtained from associated sensors. The sensors may be temperature and humidity sensors, for example, for detecting the temperature and humidity relative to an asset being tracked or monitored, with the sensor-acquired information being communicated back to an application server upon acquisition of the data by the senor or at a predetermined time, as desired.

Additionally or alternatively, the nodes of an RSI network may share a common designation other than a class designation. For instance, an RSI network may include data communication devices that interface with certain types of sensors, and the data communication devices may share a common designation that is representative of such sensors. The common designation of the RSI network in this case is not necessarily representative of an asset to be tracked or monitored by such sensors, although it may be. For instance, the sensors may include, for example, cameras and microphones. Speakers and video displays also may be associated with the data communication devices for providing over the RSI network two-way audio and/or visual communications such as, for example, video conferencing. In preferred embodiments in which the data communication devices include Bluetooth radios, the audiovisual data can be sent over TCP/IP links similar to VoIP communications.

What is claimed is:

1. A method of forming remote sensor interface (RSI) networks among a population of data communication devices, each data communication device including a wireless transceiver and machine-executable memory for storing therein sensor-acquired information, the method comprising the steps of:

(a) assigning a first common designation to a first plurality of transceivers of the data communication devices and assigning a second common designation to a second plurality of transceivers of the data communication devices, the population of transceivers of the data communication devices including the first plurality of transceivers and the second plurality of transceivers;

(b) for the first plurality of transceivers, forming a first *ad hoc* hierarchical network to facilitate communications between the first plurality of transceivers, including forming a hierarchical communication cluster by, (i) broadcasting, from a first transceiver of the first plurality of transceivers, a primary availability signal including an identifier representative of the first common designation assigned to the first plurality of transceivers, (ii) in response to receipt of the primary availability signal of said step (b)(i), transmitting, from one or more responding secondary transceivers of the first plurality of transceivers that are within range of the first transceiver of said step (b)(i), a registration signal including a secondary transceiver identifier, and (iii) storing at the first transceiver of said step (b)(i), up to a predetermined number, each secondary transceiver identifier of said step (b)(ii) that is received, (iv) wherein each secondary transceiver, for which the secondary transceiver identifier thereof is stored in said step (b)(iii), communicates directly with the first transceiver of said step (b)(i) thereby forming a communications cluster of the first *ad hoc* hierarchical network; and (c) for the second plurality of transceivers, forming a second *ad hoc* hierarchical network to facilitate communications between the second plurality of transceivers, including forming a hierarchical communication cluster by, (i) broadcasting, from a first transceiver of the second plurality of transceivers, a primary availability signal including an identifier representative of the second common designation assigned to the second plurality of transceivers, (ii) in response to receipt of the primary availability signal of said step (c)(i), transmitting, from one or more responding secondary transceivers of the second plurality of transceivers that are within range of the first transceiver of said step (c)(i), a registration signal including a secondary transceiver identifier, and (iii) storing at the first transceiver of said step (c)(i), up to a predetermined number, each secondary transceiver identifier of said step (c)(ii) that is received, (iv) wherein each secondary transceiver, for which the secondary transceiver identifier thereof is stored in said step (c)(iii), communicates directly with the first transceiver of said step (c)(i) thereby forming a communications cluster of the second *ad hoc* hierarchical network.

2. The method of claim 1, wherein one or more of the data communication devices of the population each includes an interface for electronic communication with a sensor.

3. The method of claim 2, wherein the sensor comprises one of the group of a motion detector; sound detector; vibration detector; camera; microphone; thermometer; altimeter; pressure sensor; humidity sensor; global positioning system receiver; light detector, broadband RF signal scanner; optical sensor; an accelerometer; electromagnetic detector; and a CBRNE sensor such as a chemical, biological, radiological, nuclear, or explosives material sensor.

4. The method of claim 1, wherein a data communication device of the population includes an interface for wireless electronic communication with an external sensor.

5. The method of claim 1, wherein a data communications device of the population includes an interface for wired electronic communication with an external sensor.

6. The method of claim 1, wherein a data communications device of the population includes an interface for electronic communication with an internal sensor.

7. The method of claim 1, wherein said step (b) further comprises forming a plurality of hierarchical communication clusters with the first plurality of transceivers, and wherein said step (c) further comprises forming a plurality of hierarchical communication clusters with the second plurality of transceivers.

8. The method of claim 7, wherein hierarchical communication clusters are formed in a bottom-up manner.

9. The method of claim 7, wherein hierarchical communication clusters are formed in a top-down manner.

10. The method of claim 1, wherein each transceiver of the first plurality operates from an internal power source.

11. The method of claim 10, wherein each transceiver of the second plurality operates from an internal power source.

12. The method of claim 1, further comprising the steps of:

(d) selectively communicating with the population of wireless transceivers by an application server, including communicating from the application server to the first plurality of transceivers by, (i) establishing a network link between,
(A) a gateway disposed in at least intermittent electronic communication with the application server of said step (d), and
(B) a top-level transceiver in the first *ad hoc* hierarchical network formed in said step (b), (ii) receiving, by the top-level transceiver of said step (d)(i) from the gateway of said step (d)(i), a message from the application server of said step (d), the message including one or more data packets having a preamble that includes a target identifier representing the first common designation of the first plurality of transceivers, and (iii) retransmitting the message from the top-level transceiver of said step (d)(i) down through the first *ad hoc* hierarchical network; and (e) selectively communicating with the population of wireless transceivers by an application server, including communicating from the application server to the second plurality of transceivers by, (i) establishing a network link between,
(A) a gateway disposed in at least intermittent electronic communication with the application server of said step (e), and
(B) a top-level transceiver in the second *ad hoc* hierarchical network formed in said step (c), (ii) receiving, by the top-level transceiver of said step (e)(i) from the gateway of said step (e)(i), a message from the application server of said step (e), the message including one or more data packets having a preamble that includes a target identifier representing the second common designation of the second plurality of transceivers, and (iii) retransmitting the message from the top-level transceiver of said step (e)(i) down through the second *ad hoc* hierarchical network.

13. The method of claim 12, wherein the gateway of said step (d)(i) is the gateway of said step (e)(i).

14. The method of claim 12, wherein the application server of said step (d) is the application server of said step (e).

15. The method of claim 1, further comprising the steps of:

(d) communicating sensor-acquired information from one or more of the first plurality of transceivers to an application server by, (i) establishing a network link between,
(A) a gateway disposed in at least intermittent electronic communication with the application server of said step (d), and
(B) a top-level transceiver in the first *ad hoc* hierarchical network formed in said step (b), (ii) receiving, by the top-level transceiver of said step (d)(i), up through the first *ad hoc* hierarchical network from another transceiver thereof, a message including one or more data packets having a preamble that includes a target identifier representing the first common designation of the first plurality of transceivers, and (iii) retransmitting the message from the top-level transceiver of said step (d)(i) to the gateway of said step (d)(i) for communication to the application server of said step (d); and (e) communicating sensor-acquired information from one or more of the second plurality of transceivers to an application server by,
  (i) establishing a network link between,
    (A) a gateway disposed in at least intermittent electronic communication with the application server of said step (e), and
    (B) a top-level transceiver in the second *ad hoc* hierarchical network formed in said step (c),
  (ii) receiving, by the top-level transceiver of said step (e)(i), up through the second *ad hoc* hierarchical network from another transceiver thereof, a message including one or more data packets having a preamble that includes a target identifier representing the second common designation of the second plurality of transceivers, and
  (iii) retransmitting the message from the top-level transceiver of said step (e)(i) to the gateway of said step (e)(i) for communication to the application server of said step (e).

16. The method of claim 15, wherein the gateway of said step (d)(i) is the gateway of said step (e)(i).

17. The method of claim 15, wherein the application server of said step (d) is the application server of said step (e).

18. Wireless *ad hoc* hierarchical networks formed in accordance with the method of claim 1.

* * * * *